United States Patent [19]
DeRose et al.

[11] Patent Number: 6,055,544
[45] Date of Patent: *Apr. 25, 2000

[54] GENERATION OF CHUNKS OF A LONG DOCUMENT FOR AN ELECTRONIC BOOK SYSTEM

[75] Inventors: Steven J. DeRose, Riverside; William C. Smith; Michael J. Braca, both of Providence, all of R.I.; Christopher R. Maden; Jeremy Gaffney, both of Norwood, Mass.

[73] Assignee: INSO Providence Corporation, Providence, R.I.

[ * ] Notice: This patent is subject to a terminal disclaimer.

[21] Appl. No.: 09/268,981

[22] Filed: Mar. 16, 1999

Related U.S. Application Data

[63] Continuation of application No. 08/616,930, Mar. 15, 1996, Pat. No. 5,893,109.

[51] Int. Cl.[7] .................................................. G06F 17/30
[52] U.S. Cl. .............................. 707/104; 707/10; 707/102
[58] Field of Search ............................... 707/10, 102, 104

[56] References Cited

U.S. PATENT DOCUMENTS

| | | | |
|---|---|---|---|
| 4,539,653 | 9/1985 | Bartlett et al. | 364/900 |
| 4,587,633 | 5/1986 | Wang et al. | 364/900 |
| 4,594,674 | 6/1986 | Boulia et al. | 364/523 |
| 4,608,664 | 8/1986 | Bartlett et al. | 364/900 |
| 4,710,885 | 12/1987 | Litteken | 364/518 |

(List continued on next page.)

OTHER PUBLICATIONS

Figure 4 of U.S. Patent No.: 5,276,793.
Chamberlin et al, An Extensible System for Editing Documents of Mixed Type, IEEE, pp. 317–326, Jan. 1998.
Brian K. Reid, "Scribe: A Document Specification Language under its Compiler.", University Microfilms International, Dissertation Services (1991), PP. 53–141.
Bishop et al., "Xpress Yourself," MacUser, v.8, n.11, p. B17(9), Nov. 1992.
"EBT announces plans to support important new publishing standard: DSSSL", http://www.sil.org/SGML/ebt DSSS-L.html., No Date.
"HTML to the Max: A manifesto for Adding SGML Intelligence to the World–Wide Web", Sperburg–McQueen et al., http://www.ncsa.uiuc.edu/SDG/IT94/Proceedings/Autools/sperburg–mcqueen/sperburg.html., No Date.
Morgenstern, Dynaweb Server Holds SGML Books, MacWEEK,v.8,n.28,p. 12(1), Jul. 11, 1994.
Seybold, Tools for Internet Publishing, Seybold Report on Publishing Systems,v.24,n.3,p.S16(5), Oct. 26, 1994.
Seybold, SGML in The News, The Seybold Report on Publishing Systems,v.23,n.19,p.31(2), Jul. 4, 1994.

(List continued on next page.)

*Primary Examiner*—Thomas G. Black
*Assistant Examiner*—Frantz Coby
*Attorney, Agent, or Firm*—Wolf, Greenfield & Sacks, P.C.

[57] ABSTRACT

A subset of markup elements used in an electronically published document can be defined as being "significant." For example, all titled elements may be called significant elements. The structure of the document defined by only the significant elements can be determined in the same manner as the structure of the document defined by all markup elements. For example, titled elements define a table of contents. A first representation of the document structure defined by all of the markup elements may be used in combination with a second representation of the document structure defined by only the significant elements to control selection of portions of the document such that previous and subsequent portions can be selected and rendered in a consistent and intuitive manner. In particular, given a selected leaf element in the second representation, elements adjacent to the selected leaf element may be selected and rendered according to a relationship of these elements, as defined in the first representation, to both the selected leaf element and to other significant elements in the second representation.

35 Claims, 17 Drawing Sheets

U.S. PATENT DOCUMENTS

| | | | |
|---|---|---|---|
| 4,716,404 | 12/1987 | Tabata et al. | 340/723 |
| 4,803,643 | 2/1989 | Hickey | 364/523 |
| 4,823,303 | 4/1989 | Terasawa | 364/521 |
| 4,876,665 | 10/1989 | Iwai et al. | 364/900 |
| 4,912,669 | 3/1990 | Iwamoto et al. | 707/531 |
| 4,969,093 | 11/1990 | Barker et al. | 364/900 |
| 4,970,678 | 11/1990 | Sladowski et al. | 364/900 |
| 4,992,972 | 2/1991 | Brooks et al. | 364/900 |
| 4,996,665 | 2/1991 | Nomura | 707/200 |
| 5,001,654 | 3/1991 | Winiger et al. | 364/523 |
| 5,008,853 | 4/1991 | Bly et al. | 364/900 |
| 5,068,809 | 11/1991 | Verhelst et al. | 395/145 |
| 5,079,700 | 1/1992 | Kozoll et al. | 395/700 |
| 5,089,956 | 2/1992 | MacPhail | 395/600 |
| 5,108,206 | 4/1992 | Yoshida | 400/61 |
| 5,113,341 | 5/1992 | Kozol et al. | 364/419 |
| 5,119,491 | 6/1992 | Iwai et al. | 395/600 |
| 5,130,924 | 7/1992 | Barker et al. | 364/419 |
| 5,133,051 | 7/1992 | Handley | 395/148 |
| 5,140,521 | 8/1992 | Kozol et al. | 364/419 |
| 5,140,676 | 8/1992 | Langelaan | 395/145 |
| 5,142,615 | 8/1992 | Levesque | 395/131 |
| 5,144,555 | 9/1992 | Takadachi et al. | 364/419 |
| 5,144,557 | 9/1992 | Wang et al. | 364/419 |
| 5,146,552 | 9/1992 | Cassorla et al. | 395/145 |
| 5,173,853 | 12/1992 | Kelly et al. | 707/530 |
| 5,181,162 | 1/1993 | Smith et al. | 364/419 |
| 5,182,709 | 1/1993 | Makus | 364/419 |
| 5,185,698 | 2/1993 | Hesse et al. | 364/419 |
| 5,202,977 | 4/1993 | Pasetes, Jr. et al. | 395/131 |
| 5,214,696 | 5/1993 | Keiser, II et al. | 380/4 |
| 5,220,657 | 6/1993 | Bly et al. | 395/425 |
| 5,241,624 | 8/1993 | Torres | 395/129 |
| 5,241,671 | 8/1993 | Reed et al. | 395/600 |
| 5,276,793 | 1/1994 | Borgendale | 395/148 |
| 5,285,526 | 2/1994 | Bennett, III et al. | 395/100 |
| 5,293,473 | 3/1994 | Hesse et al. | 395/146 |
| 5,355,497 | 10/1994 | Cohen-Levy | 395/700 |
| 5,367,621 | 11/1994 | Cohen et al. | 395/154 |
| 5,384,703 | 1/1995 | Withgott et al. | 364/419.1 |
| 5,428,529 | 6/1995 | Hartrick et al. | 364/419.1 |
| 5,491,820 | 2/1996 | Belove et al. | 395/600 |
| 5,495,607 | 2/1996 | Pisello et al. | 395/600 |
| 5,524,253 | 6/1996 | Pham et al. | 395/800 |
| 5,530,852 | 6/1996 | Meske, Jr. et al. | 395/600 |
| 5,546,577 | 8/1996 | Marlin et al. | 395/600 |
| 5,553,216 | 9/1996 | Yoshida et al. | 395/145 |
| 5,553,284 | 9/1996 | Barbara et al. | 395/600 |
| 5,557,720 | 9/1996 | Brown, Jr. et al. | 395/146 |
| 5,557,722 | 9/1996 | DeRose et al. | 395/148 |
| 5,572,643 | 11/1996 | Judson | 395/793 |
| 5,613,134 | 3/1997 | Lucus et al. | 395/788 |
| 5,623,652 | 4/1997 | Vora et al. | 395/610 |
| 5,634,051 | 5/1997 | Thomson | 395/605 |
| 5,644,776 | 7/1997 | DeRose et al. | 395/761 |
| 5,708,806 | 1/1998 | DeRose et al. | 395/615 |
| 5,893,109 | 4/1999 | DeRose et al. | 707/104 |

OTHER PUBLICATIONS

"A technique for Sharing Data Among Elements of a Hierarchic Document," disclosed anonymously, No. 28983, No Date.

"Intelligent Text and Image Handling", Proceedings of RIAO '91, Apr. 2–5, 1991, Barcelona, Spain, (Amsterdam: Elsevier Publishers 1991), pp. 226–244.

Chamberlin, D., "Managing Properties in a System of Cooperating Editors", Proc. Int. Conf. On Electronic Publishing, Gaithersburg, MD, Sep. 1990 (Cambridge: Cambridge University Press, 1990), pp 31–46.

J.H. Combs, A.H. Renear, and S.J. DeRose Markup Systems and the Future of Scholarly Text Processing, Comm. Of the Assoc. For Computing Machinery, Nov. 1987, pp. 933–947.

Chamberlin et al., "Quill: an Extensible system for Editing Documents of Mixed Type," IEEE 1988, pp. 317–326.

J.H. Combs, A.H. Renear, and S.J. DeRose, "Markup Systems and the Future of Scholarly Text Processing, "Comm. of the Assoc. For Computing Machinery, Nov. 1987, pp 933–947.

S.J. DeRose, D.G. Durand, E. Mylonas and A.H. Renear, "What is Text, Really?" Journal of computing in Higher Education, 1990, vol. I, No. 2, pp. 3–26.

S.J. DeRose, "CDWord Tutorial," Dallas: CDWord project, Dallas Theological Seminary, 1989.

S.J. DeRose and D.G. Durand, "Applications of Hypertext to Humanistic Textual Scholarship," manuscript submitted Jul. 22, 1987 for Hypertext '87 conference.

R. Furuta, J. Scofield, and A. Shaw, Documenting Formatting Systems: Survey, Concepts, and Issues, Computing Surveys 14(3), 1982, pp. 417–472.

P. Kahn , "Webs, Trees, and Stacks: How Hypermedia System Design Affects Hypermedia Content," Proceedings of Third International Conf. On Human–Computer Interaction, Boston, MA, Sep. 18–22.

S.P. Mudur, A.W. Narwekar and A. Moitra , "Design of Software for Text Composition," Software—and Experience (9), 1979; pp; 313–323.

J.R. Remde, L.M. Gomez, and T.K. Landaur, "SuperBook: an Automatic Tool for Information Exploration–Hypertext?", Proceedings of Hypertext '87 Chapel Hill: Dept. of Computer Science, U of N. Carolina.

J.B. Smith and S.F. Weiss, "Formatting Texts Accessed Randomly," Textlab Report TR85–031, Chapel U of North Carolina, 1985.

D. Kurth, "The Art of Computer Programming," (Reading, Mass.; Addison–Wesley, 1973, pp. 332–338.

N. Yankelovich, N. Meyrowitz, and A. van Dam, "Reading and Writing the Electronic Book," IEEE 18 (1985), pp. 15–30.

K. Robertson, J.M. Kelsey, and V. Yenbut, "ESP User's Guide," U. Of Washington, Computer Science Lab, Tech. Note #134, Rev. C, Sep. 20, 1982.

A.C. Shaw, "A Model for Document Preparation Systems," U. Of Washington, Dept. of Computer Tech. Report No. 80–04–2, Apr. 980.

M.J. Fischer and R.E. Ladner, "Data Structures for Efficient Implementation of Sticky Pointers in Text Editors," U. Of Washington, Dept. Of Computer Science, Tech. Report No. 79–06–08, Jun. 1979.

T. Allen, R. Nix, and a. Perlin, "PEN: A Hierarchical Document Editor," In Proc. ACM Sigplan Sigoia Symp. Text Manipulation, Sigplan Notices (SCM) 16.6 (Jun. 1981), pp. 74–81.

S.A. Wever, "The Design of a dynamic book for information search," the J. Man–Machine Studies (1982), 17, 87–107.

M.E. Frisse, Searching for Information in a Hypertext Medical Handbook,: Hypertext '87 Proceedings, Chapel Hill, North Carolina, 1987—, New York; ACM, pp. 57–66.

C.H. Irby, "Display Techniques for Interactive Text Manipulation," AFIPS Conference Proceedings, 1974 National Computer conf. And Exposition, vol. 43, Montvale, New Jersey; AFIPS Press, 1974.

D. Thursh and F. Mabry "An Interactive Hyper–Text of Pathology," Proceedings of Fourth Annual Symposium on computer Applications in Medical Care, Nov. 1980.

S.A. Weyre and A.H. Borning, "A Prototype Electronic Encyclopedia,"ACM Transactions on Office Systems, vol. 3, No. 1, Jan. 1985, pp. 63–88.

J.S. Brown, "Process Versus Product: A Perspective on Tools for communal and Informal Electronic Learning," J. Educational Computing Research, vol. 1(2), 1985, pp. 179–201.

D.D. Chamberlin et al., "Janus: An Interactive System for Document Composition," In proc. ACM Sigplan Notices (ACM) 16.6 (Jun., 1981), pp. 82–91.

C. Binder, "The Window Book Technology," Cambridge, Massachusetts: Box Company, 1986.

S.A. Borkin and J.M. Prager, Some Issues in the Design of an Editor–Formatter for Structured IBM Cambridge Scientific Center Technical Report No. G320–2136, Sep. 1981.

D.C. Engelbart and W.K. English, "A Research Center for Augmenting Human Intellect," In Proc. Fall Joint Computer Conf., vol. 33, AFIPS Press, Arlington, Virginia, pp. 395–410, No Date.

N. Wirth, "Data Structures and Algorithms," Englewood Cliffs, New Jersey, Prentice Halls, 1976, pp. 242–245.

Chamberlin et al., "Janus: An interactive document formatter based on declarative tags", IBM Systems Inl. 21(3) 1982: 250–271.

"Distributed Bindery Control System," 240/Research Disclosure Apr. 1993, disclosed anonymously, No. 34829.

Abandoned patent application 07/317,248, filed Feb. 28, 1989, cited in U.S. patent 5,214,696.

```
          <!ENTITY EBT CDATA
              "ELECTRONIC BOOK TECHNOLOGIES, INC.">
45~<BOOK>
     <FRONTMATTER>
       <TITLE>HOW TO USE DYNATEXT</TITLE>
       <AUTHOR>&EBT;</AUTHOR>
     </FRONTMATTER>
46~<BODY>
       <CHAPTER>
        <CHAPTITLE>INTRODUCTION</CHAPTITLE>
        <SECTION>
          <SECTITLE>STARTING UP THE SYSTEM</SECTITLE>
          <P>TO START THE SYSTEM, TYPE
            <EMPH>DTEXT</EMPH></P>
          <P>AFTER THAT JUST BROWSE, AS SHOWN HERE:
49~        <ART FILE ="MYFIG12">
          </P>
48~    </SECTION></></BODY>
47~</BOOK>
```

Fig. 4

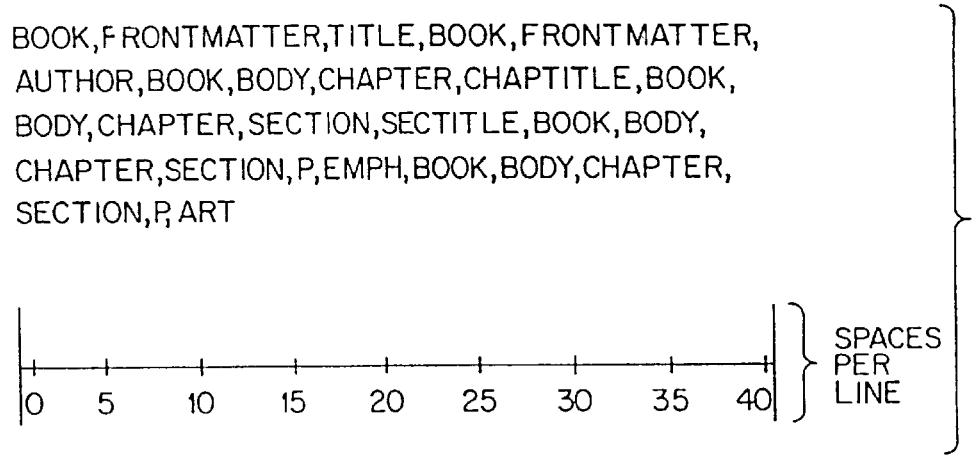

Fig. 7

|  | 92 | 94 | 96 | 98 | 100 | 102 | 104 |
|---|---|---|---|---|---|---|---|
| 70 | NIL | 71 | 76 | NIL | NIL | BOOK | NULL |
| 71 | 70 | 72 | 74 | NIL | 76 | BOOK,FM | NULL |
| 72 | 71 | 73 | 73 | NIL | 74 | BOOK,FM,TITLE | NULL |
| 73 | 72 | NIL | NIL | NIL | NIL | #TEXT | \<POINTER\> |
| 74 | 71 | 75 | 75 | 72 | NIL | BOOK,FM,AUTHOR | NULL |
| 75 | 74 | NIL | NIL | NIL | NIL | #TEXT | \<POINTER\> |
| 76 | 70 | 77 | 77 | 71 | NIL | BOOK,BODY | NULL |
| 77 | 76 | 78 | 80 | NIL | NIL | BOOK,BODY,CHAP | NULL |
| 78 | 77 | 79 | 79 | NIL | 80 | BOOK,BODY,...CHAPTITLE | NULL |
| 79 | 78 | NIL | NIL | NIL | NIL | #TEXT | \<POINTER\> |
| 80 | 77 | 81 | 87 | 78 | NIL | ... | NULL |
| 81 | 80 | 82 | 82 | NIL | 83 | ETC. | NULL |
| 82 | 81 | NIL | NIL | NIL | NIL | ... | \<POINTER\> |
| 83 | 80 | 84 | 85 | 81 | 87 | ... | NULL |
| 84 | 83 | NIL | NIL | NIL | 85 | ... | \<POINTER\> |
| 85 | 83 | 86 | 86 | 84 | NIL | ... | NULL |
| 86 | 85 | NIL | NIL | NIL | NIL | ... | \<POINTER\> |
| 87 | 80 | 88 | 89 | 83 | NIL | ... | NULL |
| 88 | 87 | NIL | NIL | NIL | 89 | ... | \<POINTER\> |
| 89 | 87 | NIL | NIL | 88 | NIL | ... | \<POINTER\> |

PARENT, FIRST CHILD, LAST CHILD, LEFT SIBLING, RIGHT SIBLING, TYPE NAME, TEXT CONTENT

TEXT VIEW
BICYCLE MAINTENANCE MANUAL
BRAKES
REPLACING AND DISASSEMBLING PARTS

REPLACING AND DISASSEMBLING PARTS

*BRAKE SHOES:*

SEE P. 218.

176

*CABLES:*

THE FREQUENCY WITH WHICH YOU WILL NEED TO REPLACE BRAKE (AND OTHER) CABLES DEPENDS ON HOW YOU USE YOUR BIKE. MACHINES CONSISTENTLY LEFT OUT IN THE RAIN, OR USED HARD EVERY DAY, ARE GOING TO NEED THEM SOONER THAN WELL-CARED-FOR OR AVERAGE-USE MACHINES. THERE IS NO HARD AND FAST RULE. ANY OBVIOUS DEFECT, SUCH AS A FRAYED CABLE, [IS GOO]D FOR REPLACEMENT.

TABLE OF CONTENTS
BICYCLE

BICYCLE MAINTENANCE MANUAL
BRAKES
  GENERAL
  HOW CALIPER BRAKES WORK
  LUBRICATION
  " ROUTINE ADJUSTMENTS

166

TEXT VIEW
BICYCLE MAINTENANCE MANUAL
BRAKES
ROUTINE ADJUSTMENTS

ROUTINE ADJUSTMENTS

CALIPER BRAKES

WHATEVER KIND OF CALIPER BRAKE SYSTEM YOU HAVE, THERE ARE TWO BASIC KINDS OF ADJUSTMENTS: (1) SEEING THAT THE BRAKE SHOE HITS THE WHEEL RIM PROPERLY, AND (2) KEEPING SLACK OUT OF THE CABLE BETWEEN THE BRAKE LEVER AND MECHANISM, SO THAT THE LEVER TRAVELS THE SHORTEST POSSIBLE DISTANCE WHEN PUTTING ON THE BRAKES.

FIRST CHECK TO SEE THAT THE WHEEL IS TRUE BY SPINNING IT AND SEEING THAT THE RIM, NOT THE TIRE, STAYS ABOUT THE SAME DISTANCE FROM THE BRAKE SHOE ALL THE WAY AROUND.

```
# DEFAULT                 # DELETE
   TITLE                     H1
   CHAPTITLE                 H2
   SECTION,SECTITLE          H3
   P                         P
   ART                       A
```

Fig. 12A

```
<H1> How to Use Dyna Text </H1>
<P> Electronic Book Technologies, Inc. </P>
<H2> Introduction </H2>
<H3> Starting up the System </H3>
<P> To Start the system, type <B>dtext</B></P>
<P> After that just browse as shown here: <A
      href="ebt.com/pro/abook#EID(89)"></a></p>
```

Fig. 12B

GENERATION OF CHUNKS OF A LONG DOCUMENT FOR AN ELECTRONIC BOOK SYSTEM

This application is a continuation of U.S. application Ser. No. 08/616,930 filed Mar. 15, 1996 now U.S. Pat. No. 5,893,109.

FIELD OF THE INVENTION

The present invention relates to computer systems for electronic publishing of electronic documents.

BACKGROUND OF THE INVENTION

Electronic publication of documents, using non-paper media for transmission and storage, has become increasingly common. Electronically published documents are generally viewed by computer, and are preferably rendered or displayed on a computer screen or other output device in a formatted form. The DYNATEXT system, a computer system available from Electronic Book Technologies of Providence, Rhode Island, is a system which is particularly useful for this purpose for very large documents.

Electronically published documents are increasingly being made available using a general markup language. A markup language provides indications of structure of the document, but excludes streams of graphic display instructions which are typically found in formatted documents. Markup languages are more portable between a variety of different machines that may use different graphic display commands. A commonly used markup language is the Standardized General Markup Language (SGML), an ISO standard.

Client-server computer systems for electronically publishing documents have also become increasingly available. Such a system typically includes one computer system (the server) on which documents are stored so that other computer systems (the clients) can access the information. The server and client communicate via messages conforming to a communication protocol sent over a communication channel such as a computer network. The server responds to messages from clients and processes requests to transmit a requested document.

An example of a client-server computer system for retrieval of electronically published documents that use a markup language is the World Wide Web (WWW) on the Internet. The WWW is a "web" of interconnected documents that are located in various sites on a global computer network. The WWW is also described in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by T. Berners-Lee, et al., *in Electronic Networking: Research, Applications and Policy*, Vol. 1, No. 2, Meckler, Westport, Conn., Spring 1992.

Documents that are published on the WWW typically are written in the Hypertext Markup Language (HTML), such as described in *Hypertext Markup Language Specification—2.01* by T. Berners-Lee and D. Connolly, Internet Draft Document, Oct. 14, 1994, and in "World Wide Web & HTML," by Douglas C. McArthur, in *Dr. Dobbs Journal*, December 1994, pp. 18–20, 22, 24, 26 and 86. HTML documents stored as such are generally static, that is, the contents do not change over time unless the publisher modifies the document.

HTML is a markup language used for writing hypertext documents. HTML documents are SGML documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

Each document available on the WWW has one or more identifiers called a Uniform Resource Identifier (URI). These identifiers are described in more detail in *Universal Resource Identifiers for the World Wide Web*, T. Berners-Lee, submitted as an Internet Request for Comments (RFC), as yet unnumbered. A URI allows any object on the Internet to be referred to by name or address, such as in a hypertext link in an HTML document. There are two types of URIs: a Universal Resource Name (URN) and a Uniform Resource Locator (URL). A URN references an object by name within a given name space. The Internet community has not yet defined the syntax of URNS. A URL references an object by defining a location and/or an access algorithm using network protocols. An example URL is "http://www.ebt.com" A URL has the syntax "scheme://host:port/path?selector" where "scheme" identifies the access protocol (such as HTTP, FTP or GOPHER); "host" is the Internet domain name of the machine that supports the protocol; "port" is an optional the transfer control protocol (TCP) port number of the appropriate server (if different from the default); "path" is an identification of the object; and "selector" contains optional parameters.

A site on a network which electronically publishes documents on the WWW documents is called a "Web site" and runs a "Web server," which is a computer program that allows a computer on the network to make documents available via the WWW. The documents are often hypertext documents in the HTML language, but may be other types of documents. Several Web server software packages exist, such as the Conseil Europeen pour 1*a* Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft MS-DOS operating system and the Microsoft Windows operating environment. The Web server also has a standard interface for running external programs, called the Common Gateway Interface (CGI). A gateway is a program that handles incoming information requests and returns the appropriate document or generates a document dynamically. For example, a gateway might receive queries, look up the answer in an SQL database, and translate the response into a page of HTML so that the server can send the result to the client. A gateway program may be written in a language such as "C" or in a scripting language such as Practical Extraction and Report Language (Perl) or Tcl or one of the Unix operating system shell languages. Perl is described in more detail in *Programming Perl*. by Larry Wall and Randal L. Schwartz, O'Reilly & Associates, Inc., Sebastopol, Calif., USA, 1992. The CGI standard specifies how the script or application receives input and parameters, and specifies how any output should be formatted and returned to the server.

A user (typically using a machine other than the machine used by the Web server) accesses documents published on the WWW runs a client program called a "Web browser." The Web browser allows the user to retrieve and display documents from Web servers. Some of the popular Web browser programs are: the Navigator browser from NetScape Communications, Corp., of Mountain View, Calif.; the Mosaic browser from the National Center for Supercomputing Applications (NCSA); the WinWeb browser, from Microelectronics and Computer Technology Corp. of Austin, Tex.; and the InternetWorks browser, from BookLink Technology, of Needham, Mass. Browsers exist for many platforms, including personal computers with the Intel Pentium processor running the Microsoft MS-DOS operating system and the Microsoft Windows environment, and Apple Macintosh personal computers.

The Web server and the Web browser communicate using the Hypertext Transfer Protocol (HTTP) message protocol and the underlying TCP/IP data transport protocol of the computer network. HTTP is described in *Hypertext Transfer Protocol—HTTP/1.0* by T. Berners-Lee, R. T. Fielding, H. Frystyk Nielsen, Internet Draft Document, Dec. 19, 1994, and is currently in the standardization process. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. For instance, to retrieve a static document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, if a user completes in a form requesting a database search, the Web browser sends an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

Interaction between Web browsers and Web servers has a number of drawbacks. First, when a document is retrieved from a server by a client, the client typically must load the entire document into the client's memory. There is no protocol which allows access only a portion of a document. To provide acceptable performance, publishers to maintain a large document as a collection of small document fragments, typically less than a few tens of printed pages equivalent in length. Such collections of small document fragments lead to document management problems.

Another restriction of the Web is that the destination of a link is typically an entire document file identified by its URL. There is no protocol for linking to targets that are a portion of a document. Although bookmarks may be used which are in the form of "http://x.com/doc.html#chap4", using such a URL causes the whole document "doc.html" to be loaded and causes the client browser to scroll to the portion labeled "chap4". Since, in practice, URLs point to entire documents, the protocol effectively requires transfer of an entire document when requested. The use of whole documents in the current implementation of the World Wide Web requires end users to wade through irrelevant information after invoking a hyperlink unless publishers commit to managing reusable information in many little files.

One difficulty with maintaining several small documents is that an electronic document without reference to a paper-based medium may not have clearly definable portions. Although documents prepared using a descriptive markup language have a structure defined by the markup, such markup defines segments which generally have variable sizes. They may be as small as one word or as large as several printed pages.

When a publisher provides many small documents, a user may want to view related documents which could be considered as occurring prior to or after the document being viewed. In current systems designed for Web servers either on a global or a local computer network, where the document is already divided into predetermined segments, the publisher typically inserts a hypertext link, in the form of a graphic or text for example, in each document to refer to the previous or next document related to the document. Such a publication system however places an unnecessary document management burden on the publisher.

In systems like the DYNATEXT publishing system, a predetermined amount of data is selected from within a document and is viewed by the user. Such a system may read files from a CD-ROM or from an electronic document stored on a file server on a LAN. If a previous or subsequent document fragment is requested, another predetermined amount of data is prepared, or the system scrolls through previous and subsequent portions of the electronic document. However, a sequence of requests for previous segments and then following segments may not produce the same result all of the time in DYNATEXT.

Accordingly, it is a general aim of the invention to provide a mechanism for accessing only a portion of a large electronically published document, and to automatically determine what portion of the document to select as a previous portion or a next portion without maintaining separate data files of each portion of the document.

SUMMARY OF THE INVENTION

A subset of markup elements used in an electronically published document can be defined as being "significant." For example, all titled elements may be called significant elements. The structure of the document defined by only the significant elements can be determined in the same manner as the structure of the document defined by all markup elements. For example, titled elements define a table of contents. A first representation of the document structure defined by all of the markup elements may be used in combination with a second representation of the document structure defined by only the significant elements to control selection of portions of the document such that previous and subsequent portions can be selected and rendered in a consistent and intuitive manner. In particular, given a selected leaf element in the second representation, elements adjacent to the selected leaf element may be selected and rendered according to a relationship of these elements, as defined in the first representation, to both the selected leaf element and to other significant elements in the second representation.

Accordingly, one aspect of the invention is a computer system for rendering an electronic document having descriptive markup defining hierarchical elements. The computer system stores a first representation of the hierarchy of all elements in the electronic document and stores a second representation of the hierarchy of only significant elements in the electronic document. In response to a request for a portion of the document, the computer system selects a portion defined by a significant element in the second representation. The selected portion is rendered by rendering the significant element defining the portion along with elements adjacent to the significant element according to a relationship of elements in the first representation to both the significant element defining the selected portion and other significant elements in the second representation.

In one embodiment, the computer system selects only a leaf element of the second representation as the significant element defining the selected portion. The significant elements may be defined as elements having a title element.

In another embodiment, the computer system selects elements in the first representation which are between the significant element defining the selected portion as represented in the first representation and a sibling of the significant element in the second representation as represented in the first representation according to a depth-first ordering of elements of the first representation. These selected elements are rendered.

In one embodiment, which is typically used in combination with the previous embodiments, the computer system determines the left sibling of the significant element and selects recursively, on the ancestor of the significant element, elements from the first representation between the significant element and any left sibling in the second representation of any ancestor element in the second representation of the significant element, according to a depth-first ordering of elements of the first representation, when the significant element is a first child element in the second representation of the ancestor element.

In another embodiment, typically used in combination with other embodiments, the computer system determines the right sibling of the significant element selects no elements after the significant element in the first representation if the significant element is not a last child element in the second representation. Additionally, the computer system selects recursively, on the ancestor of the significant element, all elements which are after the significant element in the first representation according to a depth-first ordering of elements in the first representation and which are child elements in the first representation of the ancestors in the second representation of the significant element if the significant element is a last child element in the second representation.

By relying on two definitions of the structure of an electronic document using a generalized markup language, the present invention improves document management by permitting a user to view self-contained document fragments and to navigate between different document fragments in a manner which provides consistent results to the user.

The need to generate may small documents with hyperlinks between them is eliminated. If a document is modified, only its structure needs to be recomputed. It is no longer necessary to determine whether hyperlinks between document chunks remain valid after an edit.

In addition, by providing a system for rendering electronic published documents which uses a generalized markup language and a declarative specification, such as a style sheet, for formatting the document into a specific markup language or streams of graphic instructions, this form of document management is greatly simplified. For example, if a new target markup language is made available or if a new tag is added to a particular markup language, all documents can be delivered in the new target markup language merely by changing the declarative specification without modifying the document. A large amount of document management effort, such as modifying individual documents and the risks inherent in such modification, is avoided. The declarative specification is also useful in an environment where a variety of client systems using different target markup languages are being used simultaneously by possible consumers of the published documents. The system described herein allows many versions of a single deliverable to be readily available to these users. Additionally, the need to maintain many small documents and to provide navigational documents is eliminated because they are generated dynamically instead. Additionally, navigational tools such as full text indices and tables of contents may be used to improve information retrieval.

BRIEF DESCRIPTION OF THE DRAWING

In the drawing,

FIG. 4 is an illustration of a sample document with descriptive markup;

FIG. 6 is an illustration of an element directory with example values corresponding to the document of FIGS. 4 and 5;

FIG. 7 is an illustration of a fully-qualified name table with example values corresponding to the document of FIG. 4;

FIGS. 9–11 are example display views produced for tables of contents, full-text searches and document fragments;

FIG. 12A shows a sample DTD mapping table;

FIG. 12B shows a sample HTML document which results from the DTD mapping table of FIG. 12A and the SGML sample document of FIG. 4;

DETAILED DESCRIPTION

The present invention will be more completely understood through the following detailed description which should be read in conjunction with the attached drawing in which similar reference numbers indicate similar structures. All references cited herein are hereby expressly incorporated by reference.

The present invention provides a document retrieval system for electronically published documents, particularly those written using a general markup language. A markup language consists of tags which are used to prepare a structured document. One commonly-used markup language is the standardized general markup language (SGML) which is International for Standards Organization (ISO) standard 8879-1986. Other example markup languages include LaTex and Scribe.

One embodiment of the invention handles documents written using SGML. Such documents are processed to improve searching and retrieval time of document portions. Such processing is described in U.S. patent application Ser. No. 07/733,204, filed Jul. 19, 1991, which is hereby incorporated by reference.

The system described in the U.S. patent application Ser. No. 07/733,204 can be modified in accordance with the teachings herein to act as a server which provides electronically published documents to client viewer systems which receive and process documents in a markup language. Such a server would be useful as a Web server to down-convert SGML documents to HTML documents, or to provide access to a compact disk, read-only memory (CD-ROM) or to a data file of the electronically published document on a computer network.

Figure 1:
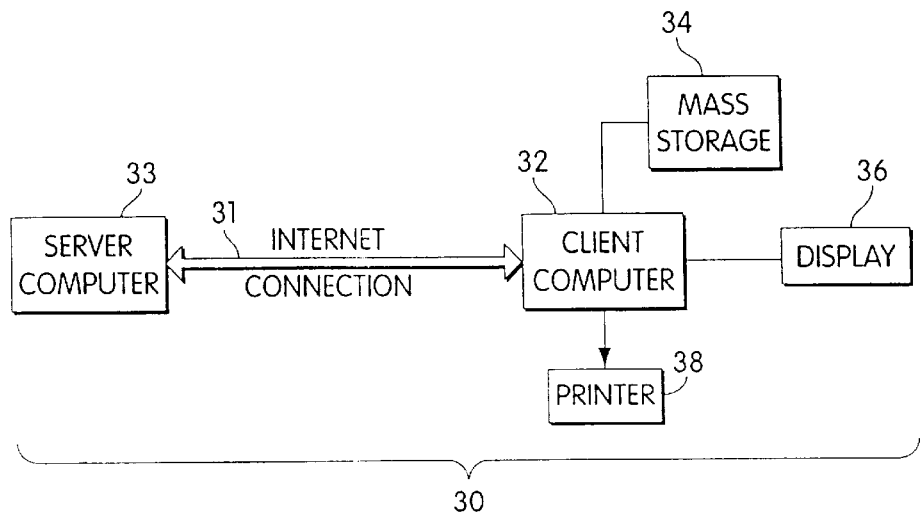
FIG. 1 is an illustration of a general purpose data processing system.

Referring now to FIG. 1, a data processing system 30 includes a client computer 32 which has a mass storage device 34, such as a disk drive. The mass storage device 34 may be internal (not shown) or external (as shown) to the client computer 32. The data processing system 30 also includes an output device such as a monitor, or graphic display 36 and, optionally, printer 38. The client computer 32, combined with display 36, may be programmed to enable multiple simultaneous views, popularly known as "windows", which facilitate providing the user with access to multiple processes. One or more of these processes may be a client program such as a Web browser.

The client computer 32 is connected to a server computer 33 via an interconnection 31. The interconnection 31 may be permanent or temporary, and may be any form of computer network such as the Internet, private LAN, modem connection, etc. The server computer is configured to run a server program, such as a Web server. The client computer 32 may execute any of a number of client programs, such as a Web browser. The client programs and server programs may also be executed on the same machine.

Figure 2:
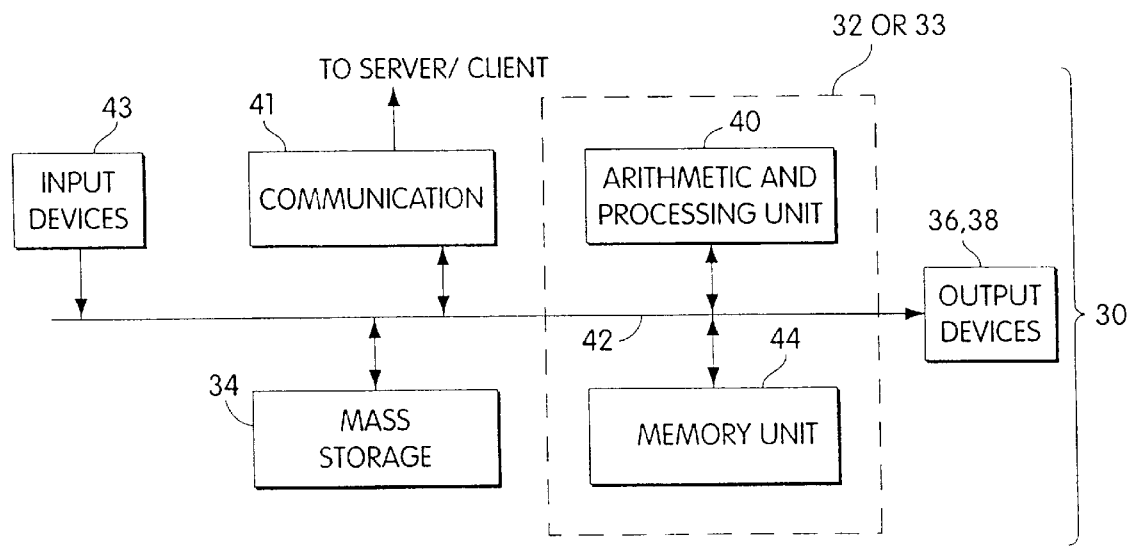
FIG. 2 is a block diagram of the data processing system of FIG. 1.

FIG. 2 shows further detail of the structure of either the client or server computers. Computer 32 or computer 33 includes a processing and arithmetic unit 40 and a memory unit 42 connected to the processing unit via an interconnection mechanism 44 such as a bus. Mass storage 34 is also connected to the memory unit and processing unit via the interconnection mechanism 44 along with the output devices 36 and 38. Input devices 43 may be provided, of which a keyboard, mouse, tablet, trackball and other device are examples. A communication connection 11, such as a modem or network interface card, is also provided to make the connection to the client or server or other computers.

The data processing system 30 may be implemented using a number of general purpose computer platforms, such as the IRIX 5.x, from Silicon Graphics, Inc., of Mountain View, Calif. Other example platforms are DOS, WindowsNT, Windows95, Solaris 2.x, HPUX 9.x, IBM AIX 3.2.x, DEC Alpha/OSF 3.x, UnixWare 2.x and Solaris X86.

The data processing system 30 is configured to be a specific machine or to perform a process using a computer programming language, such as the "C++" programming language. It should be apparent to those skilled in the art that the present invention is not limited to a specific programming language or a specific general purpose data processing system and that programming languages and general purpose data processing systems other than those specifically mentioned herein may be used.

Figure 3:
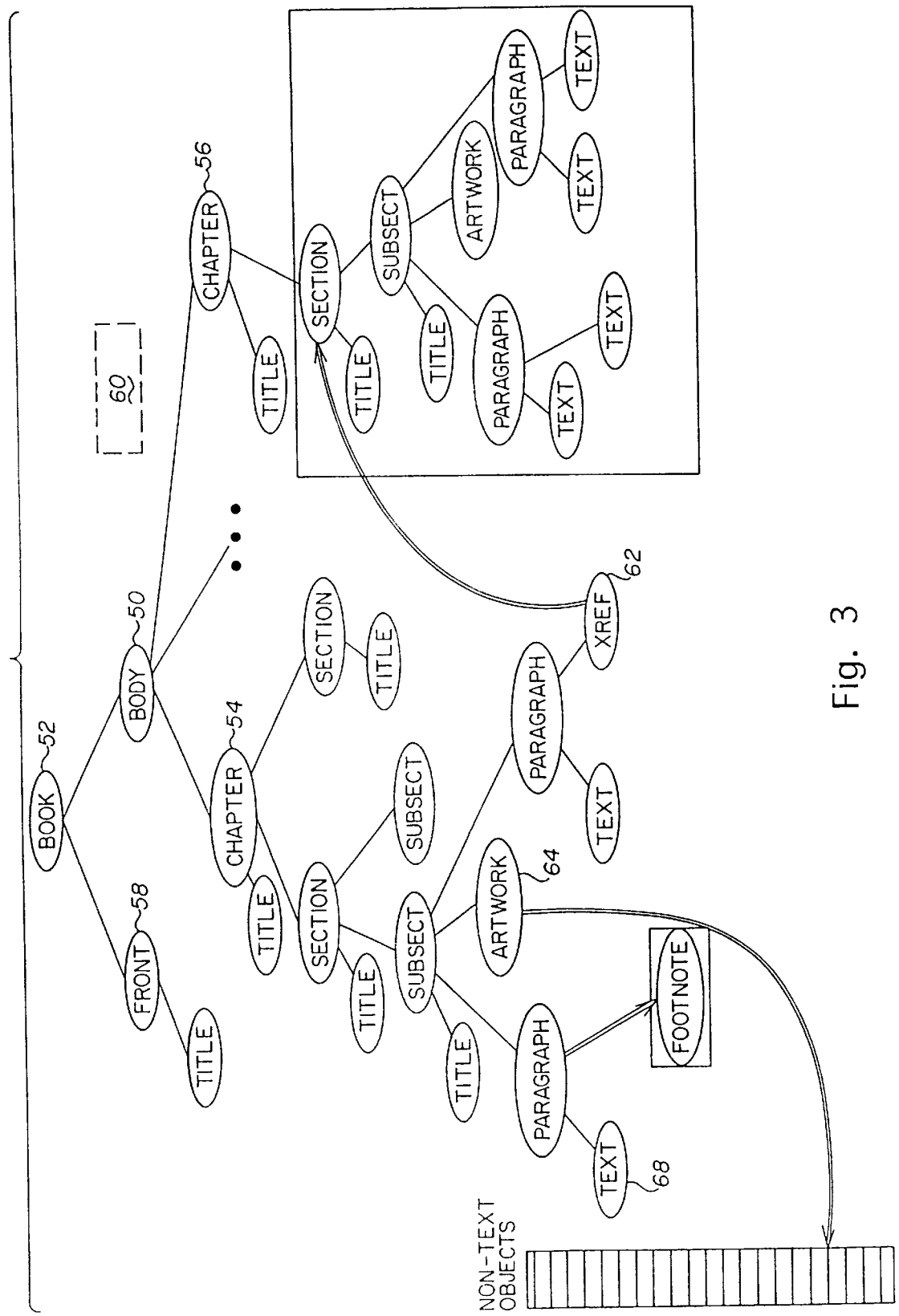
FIG. 3 is a diagrammatic illustration of the hierarchical structure of an example document with descriptive markup.

The computer system described herein handles structured documents in electronic form which include text content, descriptive markup and possibly non-text content. This system is particularly useful with large electronic documents, of which typical examples are electronic books such as operation manuals for large systems, such as computer systems, airplanes and ships. The descriptive markup of an input document is interpretable as an ordered hierarchy of content objects, such as illustrated in FIG. 3. That is, the descriptive markup defines a structure including a set of elements which, when taken together, form a tree or similar hierarchical object. A markup element describes the function or meaning, rather than the appearance, of the text which it includes. Elements representing only appearance or format characteristics may be used, but are non-optimal.

In such a document, an element, e.g. element 50 of FIG. 3, may have a parent element (52), a first child element (54), a last child element (56), a left sibling element (58), and a right sibling element (60). In the example just described, a right sibling of element 50 does not exist in the document, and is therefore defined by "nil", or some non-element identifier. Similarly, if an element does not have first or last children elements, a left sibling element, or a parent element, the corresponding values are also defined to be 'nil' or some other non-element identifier. The text content elements 68 of a document are normally found as the leaves of a tree.

A document may also include other types of elements which do not describe function, meaning or appearance of the text. These types of elements include cross-referencing elements 62 which may be used to link relevant sections of a document or even separate documents. Artwork elements 64 may be used to point to non-text objects, such as graphic raster files, which also may be separate electronic documents.

An example of a descriptive markup language for electronic documents is specified by ISO standard 8879: Standard Generalized Markup Language, or, "SGML". This standard is described in "Information Processing—Text and Office Systems—Standard Generalized Markup Language (SGML)," by the International Organization for Standardization, ISO 8879-1986(E), which is hereby incorporated by reference. Documents in SGML may be created using standard text editors, such as SoftQuad Author/Editor, which is commercially available from SoftQuad, Inc., of Toronto, Ontario, Canada. The "Scribe" and "LaTeX" word processing languages are similar document markup languages. Other suitable markup languages may also be used.

Documents which comply with the SGML standard are particularly useful because of the acceptance of the standard by publishers and government agencies. SGML-compliant documents may be made from other types of documents using commercially available systems. A simple exemplary SGML compliant document is provided in FIG. 4.

An SGML document includes markup tags which may be described as start tags, end tags, or empty tags. An empty tag may be understood as being both a start tag and an end tag. In this sample document of FIG. 4, start tag 45 begins a markup element. An end tag, such as end tag 47, ends the corresponding markup element. Thus start and end tags define a markup element. Elements having start and end tags occurring between the start and end tags of another element (as tags 46 and 48 are between tags 45 and 47) are defined to be children, descendants, or lower elements of the tree. The containing markup element is called a parent or ancestor element. Children at the same level beneath a parent are siblings.

Some of the tags in the descriptive markup of the document may also be empty tags such as tag 49 (FIG. 4). Such empty tags may be used for cross-referencing, referencing other documents, or for referencing graphic or other types of non-text information, etc. Tags often have attributes which are variables, such as "file", which are assigned to values, such as "myfig12". Attributes may be interpreted when the document is rendered to retrieve graphics files, etc. Normal start tags 45 may also include attributes which are often useful for marking text which is to be hidden for security or other reasons, or for attaching a unique identifier for an element for cross-referencing or other uses. For example, when a document is rendered, an attribute for a start tag may be examined, and if the attribute has a predetermined value, display of that material may be prevented or modified, thus providing security for a document.

Figure 5:
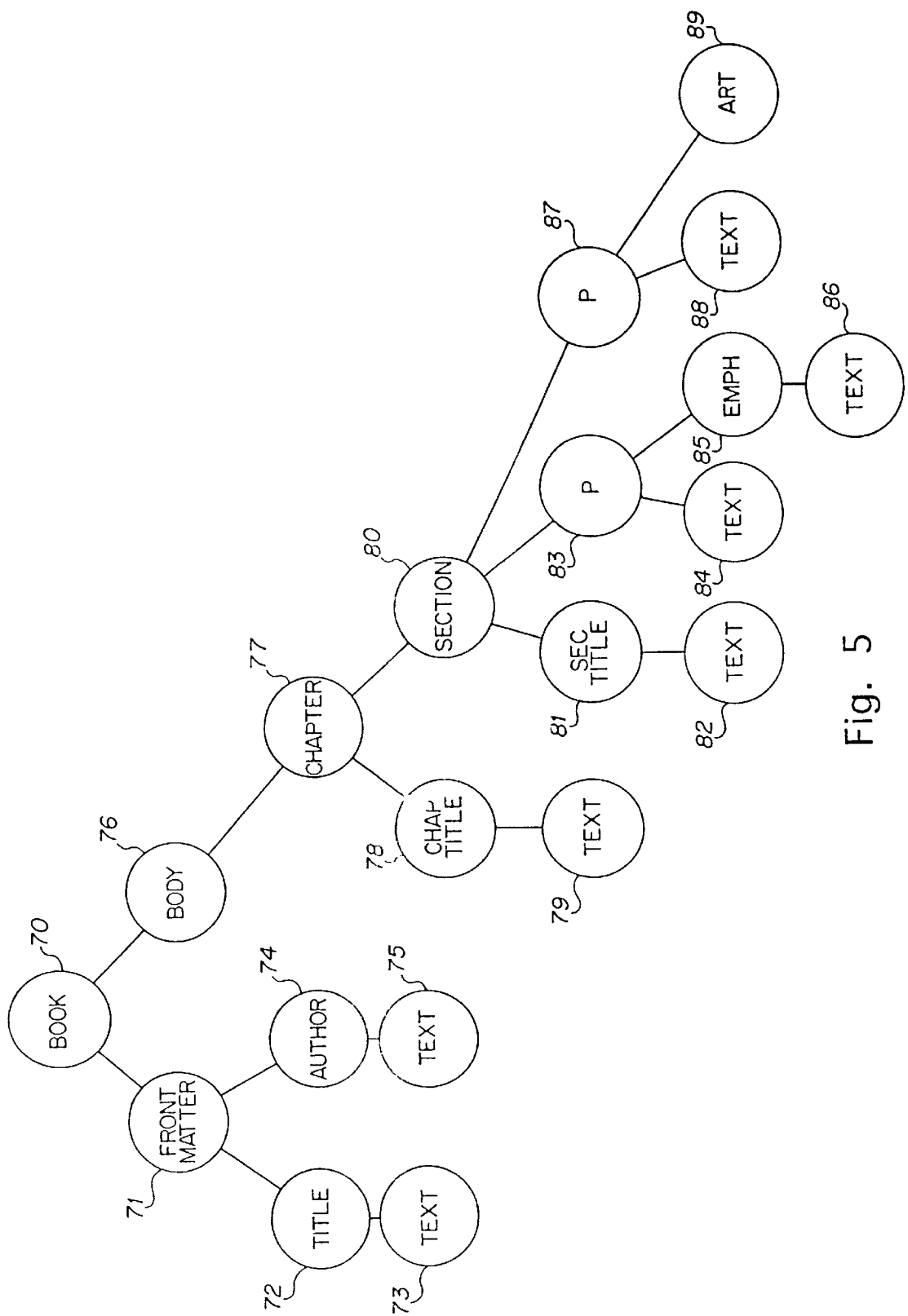
FIG. 5 is a diagrammatic illustration of the hierarchical structure of the sample document of FIG. 4.

FIG. 5 is a representation of the tree structure generated from the sample SGML document of FIG. 4. The process of generating this representation is described in U.S. patent application Ser. No. 07/722,204. Reference numbers 70–89 have been assigned to the elements defined by the markup structure of the SGML document. Sequential numbers, or element identifiers may be assigned to each element appearing in the document according to the order of appearance of these elements in the document. These element identifiers are used in the generation of an element directory 91 (FIG. 6), which is used to assist navigation of the document.

The data structure of FIG. 6, the element directory 91, is an array of element descriptors 90. Each element descriptor 90 represents an element of the document. In one embodiment, an element descriptor 90 is easily retrieved from the array on the basis of the element identifier which is assigned to its corresponding element. The element descriptor 90 includes a field 92 for representing the parent of the element, a field 94 for representing the first child, a field 96 for representing the last child, a field 98 for representing a left sibling, a field 100 for representing a right sibling, a field 102 for representing the type of the element, and a field 104 for representing the location of text characters for a text chunk or the location of other data associated with the element such as attributes. Typically, a separate document is maintained in which text context is stored. Field 104 may be pointer to a location in this document. Alternatively it may be an offset and length in the original SGML document. Those fields which represent elements, such as parent, child and sibling elements, may contain the element identifiers assigned to those elements.

The above-described representation of an element descriptor may be further optimized for documents which are not modified after its element directory is generated.

In this case, the element identifier of a first child of an element is the immediately succeeding element identifier of that element. Thus, this field may be reduced to a one-bit representation, e.g. '1' may indicate that there is a first child and '0' that there are no children.

Another variation for the element directory 91 may include element descriptors 90 of variable size. Since a descriptor 90 may have a few NIL values, the size of the corresponding fields may be reduced. An element descriptor 90 may then be accessed from a file according to the offset or location in the file and length of the descriptor 90. Element identifiers assigned to element descriptors may be mapped to the values of the offset and length of their corresponding element descriptors. Such a modification may reduce the size of the element directors 91, but increases the time it takes to access an element descriptor.

In the example of FIG. 6, element descriptor 90 corresponds to element 70 of FIG. 5. Since element 70 does not have a parent element, parent field 92 includes a non-element value. Similarly, left and right sibling fields 98 and 100 also include non-element values. Field 102 includes a representation that element 70 is of the type, "book".

The size of element type field 102 may be kept constant across all element descriptors. In one embodiment, the element type in field 102 is represented by a pointer to another data structure, or data file, called the fully-qualified name table. The fully-qualified name table is a list of element types encountered in the document. The pointer includes a representation of the offset, or location, of the element type in the fully-qualified name table and possibly the length of the type name.

One embodiment of a fully-qualified name table is represented as a compressed list in FIG. 7. The list is compressed by representing as many sequential types as possible in a compressed form. That is, rather than having a list of:

"BOOK"

"BOOK,FRONTMATTER"

The list is compressed to "BOOK,FRONTMATTER". Thus, repeated occurrences of a partial or complete type name may be eliminated. The table of FIG. 7 corresponds to the example document represented by FIGS. 4–6 and is to be understood as a stream of characters. Thus, as an example, field 102 for element 70 (of type "BOOK") would show an offset of 0 and a length of 4, since the first occurrence of "BOOK" is at the beginning of the table and has a length of four characters. Similarly, the entry for field 102 for element 76, i.e. the element whose parent is 70 and first child is 77, would have an offset of 47 and a length of 9, since the first occurrence of "BOOK, BODY" occurs at the 47th character in the table and is 9 characters long. Likewise, element 71 ("BOOK, FRONTMATTER") has an offset of 0 and a length of 16. Various other methods of representing a fully-qualified name for the element may be used, such as a list of fully-qualified names retrieved according to their placement in the list. However, it may be desirable to keep the size of this table sufficiently small to allow the fully-qualified name table to be loaded into RAM.

Creation of the full text index of the document will now be described in connection with FIG. 8. Full text indexers which find and report the number of occurrences of selected words in a document have been known for some time. Such an indexer would determine, for example, that in the sample document of FIG. 4, the word "starting" occurs once, and the word "system" occurs twice. However, such systems normally identify only the total number of occurrences of a word in a document or in a certain level of granularity of a document, such as a paragraph. In one embodiment of this invention, the number of times a word is found in each element and sub-element of different levels of a document is recorded. The procedure for obtaining this result is called hierarchical indexing. Hierarchical indexing is described in U.S. patent application Ser. No. 07/733,204, and uses a data structure as shown in FIG. 8.

Figure 8:
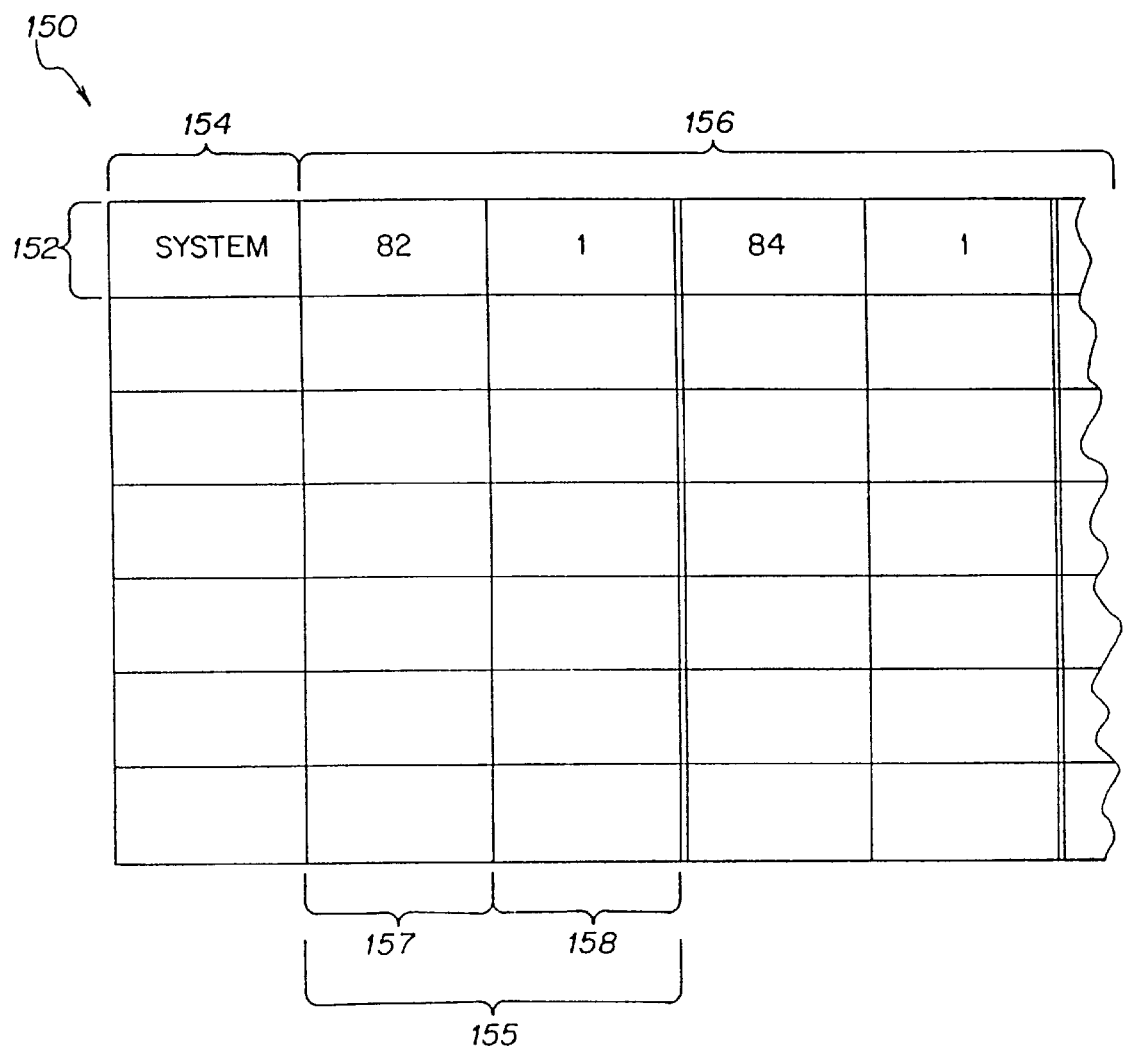
FIG. 8 is an illustration of a frequency record for full text indexing.

FIG. 8 illustrates a frequency record table 150 which includes an entry 152 for an indexed word. An entry 152 includes a field 154, which represents the word and records 156 which make an ordered list of pairs of an element identifier (field 157) of the element in which the word (field 154) occurs, and the number of appearances of that word in that element (field 158).

The frequency record 150 is slightly different in initial result for the different methods. With the first method, the resulting frequency record for a word initially includes the number of occurrences of that word for the different leaves of the tree, i.e., the text chunks. When a document is searched for a word by a user, a summation of occurrences of the word in each element of the document performed in the manner described in U.S. patent application Ser. No. 07/733,204. According to the second method, the frequency record for a word includes the number of occurrences of a given word in each element or sub-element of the document rather than only in the leaf elements.

This method is normally performed as a user-independent process, before a user views the document. The procedure for this method is also described in U.S. patent application Ser. No. 07/733,204. With both methods, the result visible to the viewer of the document is the same.

The architecture described above simplifies access to very large documents in a client-server system across the Internet or other computer networks by reducing the amount of information that is transmitted and by improving navigational and viewing tools. One aspect of this improvement is provided by using an element locator, which indicates an element within a document, in combination with a document locator, such as a file name or URL. The element locator is a starting point from which viewing of a document can begin which eliminates the need to transmit an entire document across a computer network.

Figure 10:
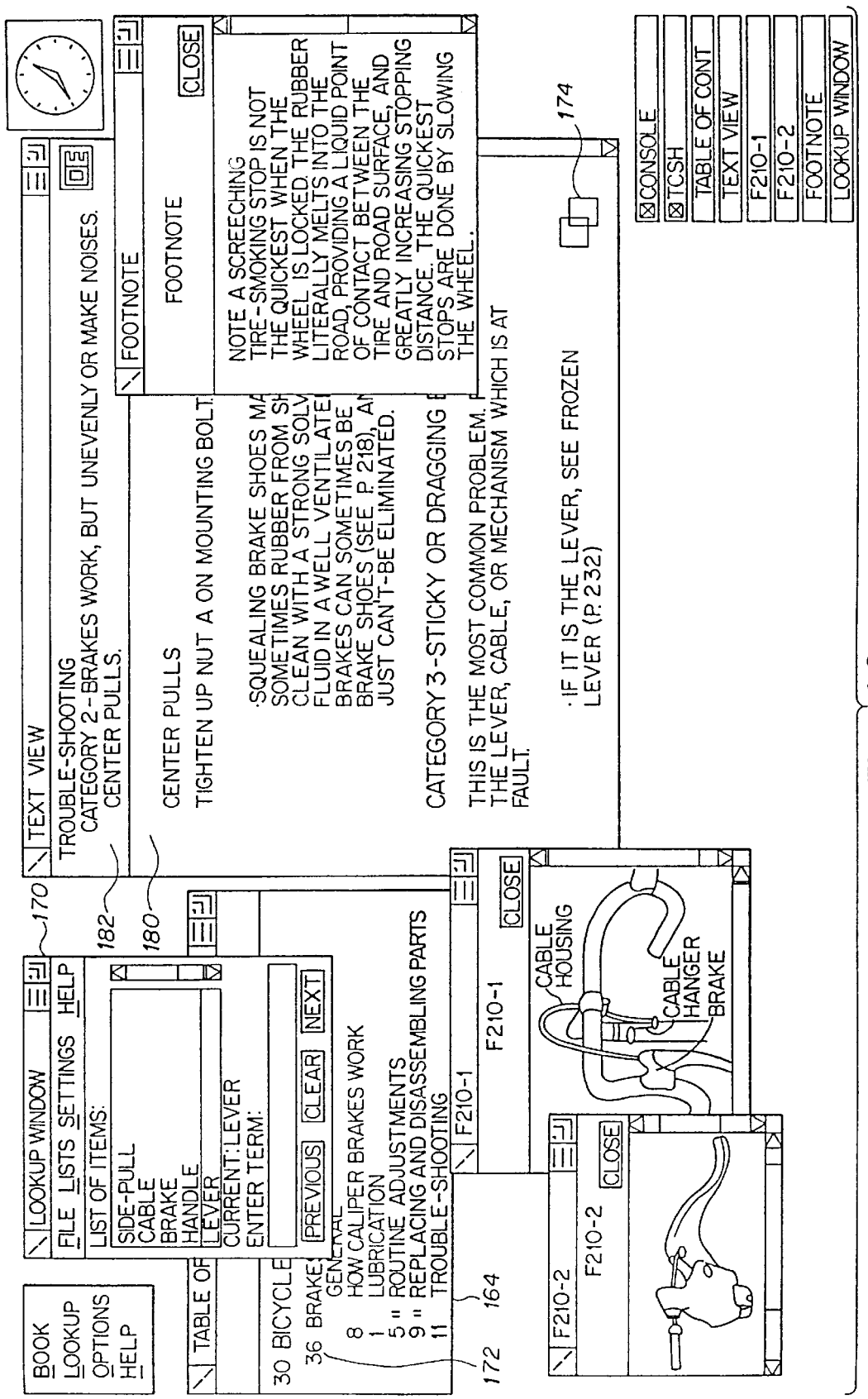

A variety of mechanisms may used for obtaining from a user a desired starting point from which rendering of a document may begin. One mechanism is a table of contents from which a section of a document may be selected, such as shown at 160 and 162 in FIG. 9, at 164 in FIG. 10 and at 166 in FIG. 11. A user may also have a directed path, bookmark, history log or other list of preselected starting points. A user may also perform a search for a word based on the full text index. For example, a user may input a word using an interface such as shown at 168 in FIG. 9 and at 170 in FIG. 10. The table of contents, when generated and displayed, indicates the number of occurrences in the section referred to by the table of contents, such as indicated at 172 in FIG. 9. By selecting on an element in the table of contents, the computer system begins rendering at the selected element in the document. Alternatively, a particular occurrence of a word may be selected and document rendering may begin with an element including the selected word. Additionally, a document, while being rendered, may cause possible cross-references to be displayed, as shown at 174 in FIG. 10 and at 176 in FIG. 11. These cross-references may also be used to select a starting point for rendering of the document.

A reference to an element within a document may exist in many forms. Generally, this starting point is defined by a reference to the document on the server (herein called a document locator), combined with a reference to an element within the referenced document (herein called an element locator). For example, in an embodiment to be used on the WWW, a document locator may be a URL: "http://www.ebt.com/pro/abook". In a private LAN, the document may be an actual file name in the file system. An element locator may be an element identifier for the element as defined using the element directory 91, such as the number thirteen. Thus the thirteenth element of the "abook" document may be accessed using the following string: "http://www.ebt.com/pro/abook#EID(13)". An element locator may also be in any format which can identify uniquely an element. Several such representations are used by the Text Encoding Initiative (TEI) or the Hytime ISO standard 10744. For example, the element locator may be identified by a numerical index representing the child number at each level of the tree along the path to the selected element. For example, the string "1-5-7-1" represents the first child of the seventh child of the fifth child of the first child of the root node. Each number in this list may also be qualified by element type so that instead of representing the "nth" child, the number may represent the "nth" chapter or section, for example. Such a representation of the element locator may also be used to traverse an element directory 91 shown in FIG. 6. Alternatively, an unparsed representation of the SGML file may be used, but would require parsing of the SGML document using the element locator to access the document fragment indicated by the element locator. Parsing of an SGML document is described in U.S. patent application Ser. No. 07/722,204 and can be modified to allow for matching an element locator.

Given document and element locators, a fragment of a document may be accessed and transferred from a server to a client program. When the document fragment is transferred, it may be converted from one markup language to another or the document fragment may be formatted as described in U.S. patent application Ser. No. 07/722,204. The process of down-converting a fragment of a document in one markup language to a document in another markup language, using a document locator which includes an element locator, will now be described in connection with FIGS. 12–16. While this description is provided using HTML as the target markup language and SGML as the source markup language, it should be understood that other target and source markup languages could be used. FIG. 12B illustrates an HTML document that results from the SGML sample document shown in FIG. 4. It includes a cross reference that is an element within a document. In particular, the art element 89 as shown in FIGS. 5 and 6 is represented by a cross reference to another file accessible using the element identifier for element 89.

This process of down-conversion uses a mapping table that maps elements in the source markup language to corresponding elements in the target markup language. The mapping table is a declarative specification that operates on document structure. One form of mapping table is a style sheet defined for a particular document type. An example table for converting SGML to HTML is shown in FIG. 12A. In particular, the default is that an element is deleted as shown in row 200. Row 202 indicates that a <title>tag converts to an <H1>tag. A <chaptitle>tag is converted to an <H2>tag (row 204). <Section> and <sectitle>tags are converted to an <H3>tag (row 206). Finally, <P>tags (row 208)convert to <P>tags and the <art>tag converts to a cross reference tag such as <A href=". .">(row 210).

Figure 13:
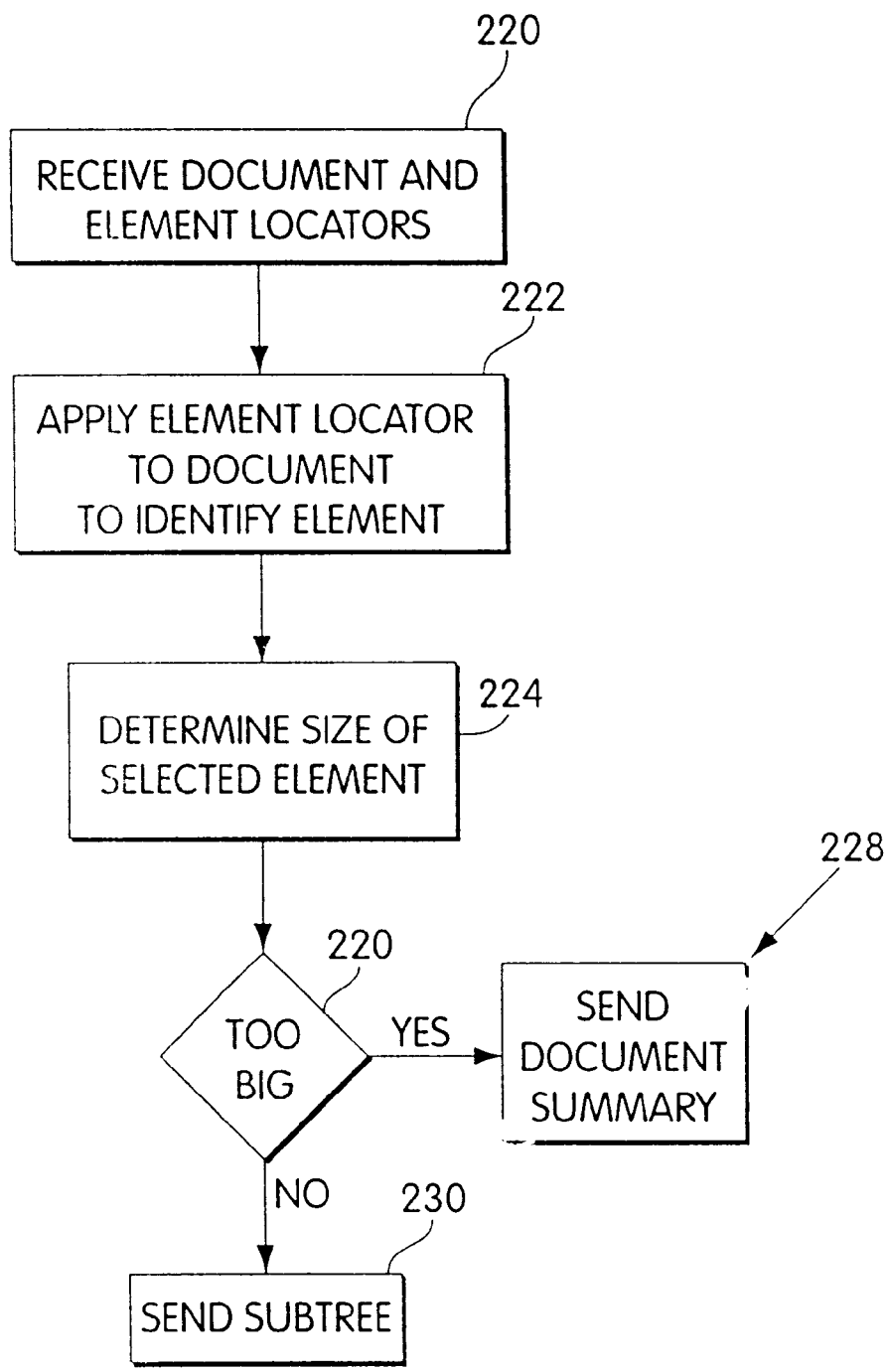
FIG. 13 is a flowchart describing how the server processes a request for a portion of a document.

Processing of a document locator and element locator to process and send a subtree of a structured document will now be described in connection with FIG. 13. The first step, performed by the server, is receiving the document and element locators, as shown in step 220. The element locator is applied to the document indicated by the document locator in step 222 to identify and access the referenced element. Using a pre-processed representation of the document, including an element directory 91 as shown in FIG. 6, this step would retrieve the entry for the given element identifier in the element directory 91. This entry contains information which then provides indicators of other elements in the document structure and the location of text and other information.

Optionally, the selected element may be the significant element, as defined below, which contains the element indicated by the element locator.

Next, the size of the selected element is determined in step 224. This step permits the system to avoid sending a document which is too large to send in an acceptable period of time. The process of determining the size of a selected element is described in more detail below in connection with FIG. 14.

Given the determined size of the selected element, if it is too big (as determined in step 226) a document summary, such as a table of contents, or other navigational aid, is sent in step 228 rather than the actual text of the selected element, unless the selected element is a significant leaf element as defined below. Such aids could also be generated like a header or footer to be sent with a document fragment. The process of determining the table of contents is described in more detail below in connection with FIG. 16. If the determined size is not too big, the selected subtree is sent in step 230. The step of sending the selected subtree includes the down-conversion process from SGML to HTML and is described in more detail below in connection with FIG. 15.

Figure 14:
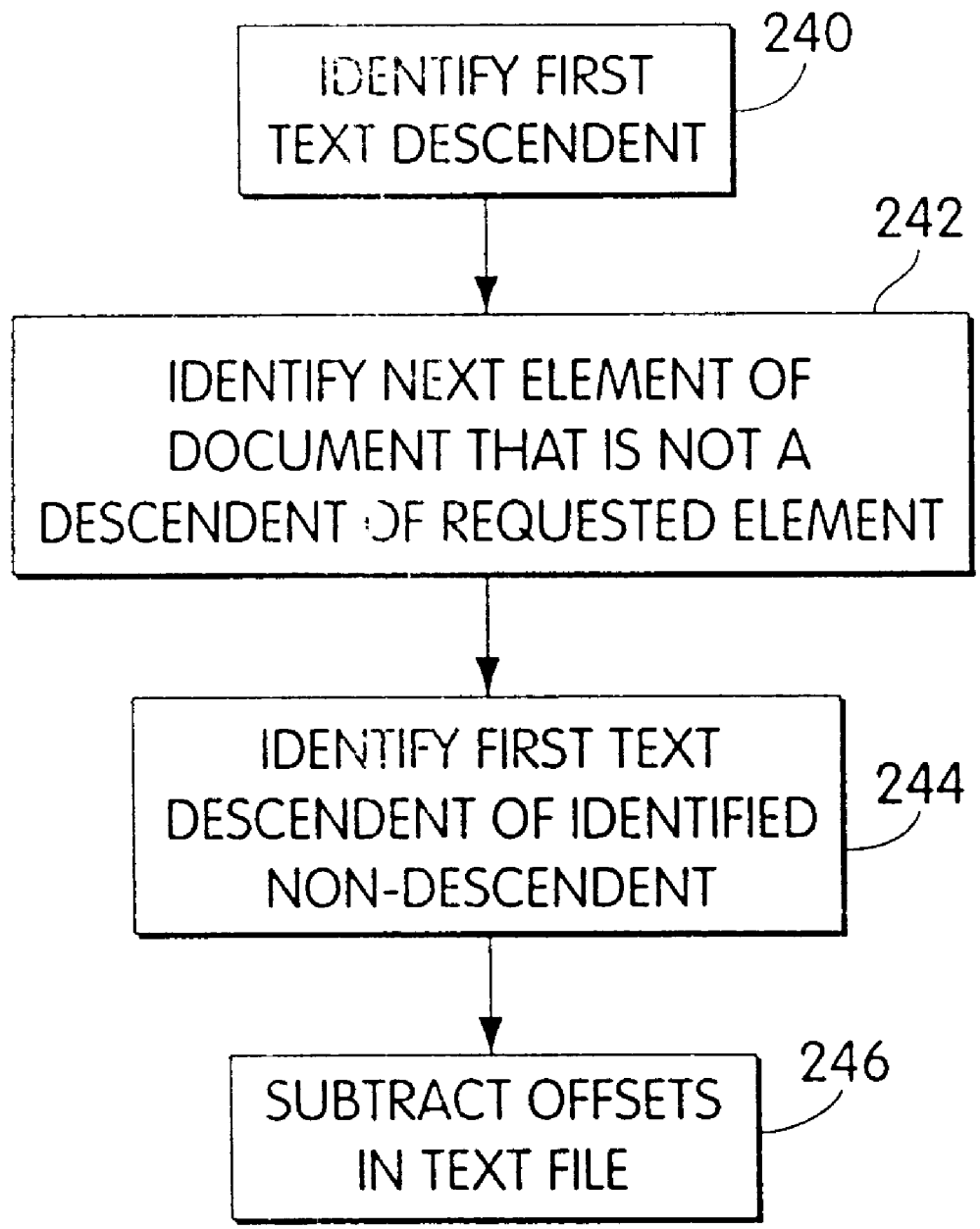
FIG. 14 is a flowchart describing how the size of a document fragment is determined.

Determination of the size of the selected element will now be described in connection with FIG. 14. There are many methods to determine the size of the selected portion of a document which generally depends on how the document is represented and parsed by the system and is of little consequence if efficient. The size may also be pre-computed and stored for each element. The following example assumes that an element directory such as shown in FIG. 6 is used.

The first step of determining the size of a selected portion of a document involves identifying the first text descendant of the selected element, as shown in step 240. This step is performed by simply accessing the element directory 91 in a sequential manner starting with the selected element until a text element is identified. For example, if the selected element is element 71 in FIG. 5, the first text descendant would be element 73. Next, the next element of the document which is not a descendant of the selected document is identified in step 242. This element is generally the right sibling of either the selected element or the closest ancestor having a right sibling. In particular, element 76, as shown in FIG. 5, would be identified by step 242 if the selected element is element 71.

The first text descendant of the element identified in step 242 is then identified in step 244. This identification may be performed in the same manner as described above in connection with step 240. In this example, the first text descendant of element 76 is element 79.

By identification of text elements in step 240 and 244, the element directory 91 may be used to determine the location or offsets in a text file of the text content of these text elements. These offsets in the text file are provided by field 104 for the selected text elements. The offsets are subtracted to provide an estimate of the size of the selected portion of the document.

An alternative method to determining the size of the tree is by examining whether the element to be sent contains multiple titled elements that are not in an ancestor/descendant relationship. In such a case, a document summary may be sent, such as a table of contents expanded to the level of the requested element.

The process of sending a subtree, step 230 in FIG. 13, will now be described in more detail in connection with FIG. 15. This process is very similar to the process of rendering an SGML document using style sheets as described in U.S. patent application Ser. No. 07/733,204. The process of traversing the SGML document to identify elements and their tags and to apply corresponding style sheets is described therein. Additionally, the rendering process results in the generation of a document in a second markup language, which is then transmitted across the network to a client system. This translation may be made by using style sheets, in a manner described below, to implement a mapping table.

Graphic display commands and formatting properties typically are applied by the client system that parses the down-converted document chunk into a formatted display on the client computer screen. In another embodiment of the present invention, the formatting is performed by the server and the client receives a formatted document.

Figure 9:
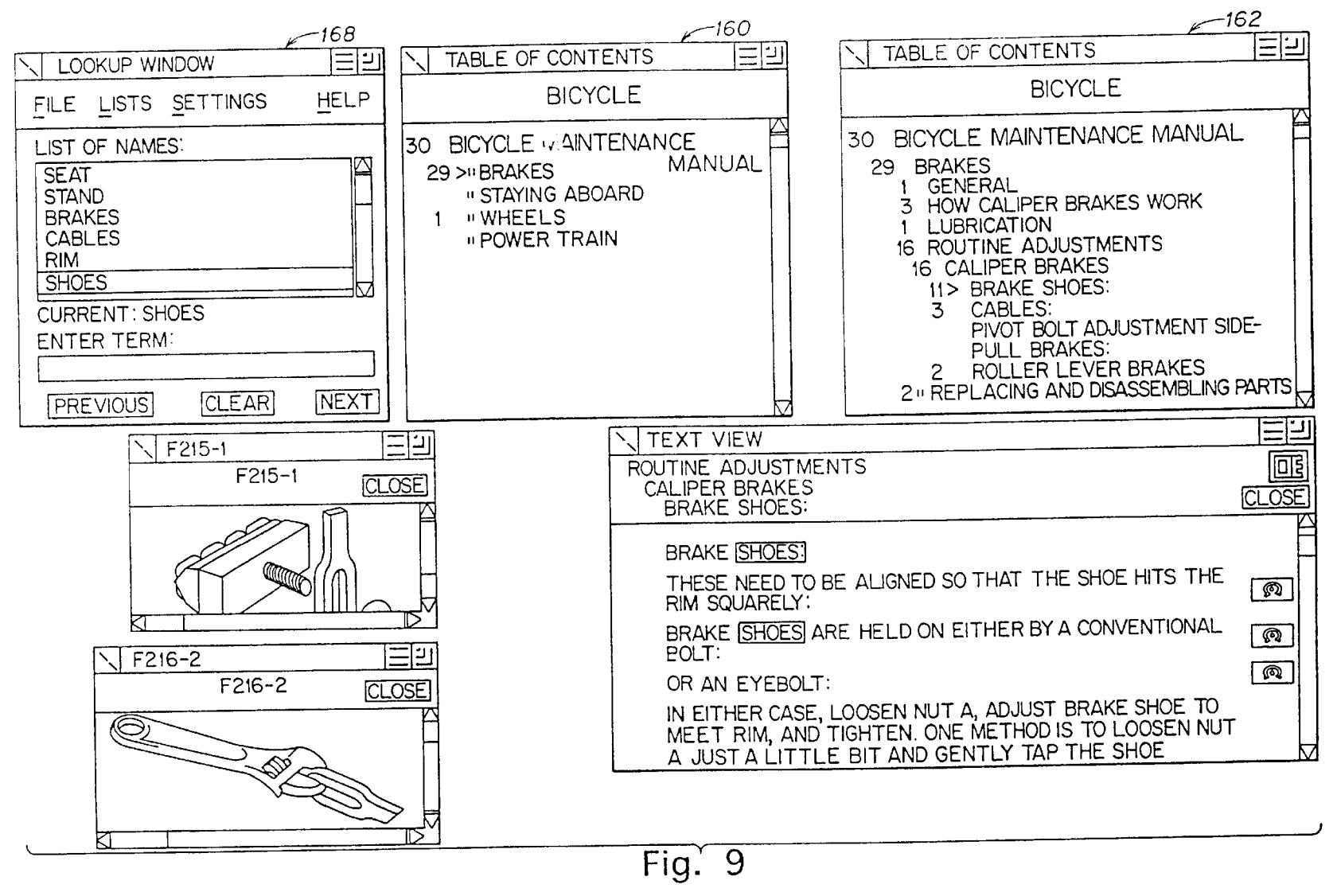

In the system described here, context information may be combined with each transmitted chunk of the SGML document. Such context information may be similar to header and footer information on paginated printed copies of a rendered SGML document. Such context information may also include a copyright notice, disclaimers, indications of the structure of the document or other content such as shown at 182 in FIG. 9. This context information may also be hypertext link to content of the electronic document which is prior or subsequent to the currently displayed element, such as shown at 180 in FIG. 9 FIG. 15 illustrates the steps taken by the server to down-convert an SGML document fragment to generate an HTML document. While the following description uses SGML and HTML as example source and target markup languages, it should be understood that other markup languages may be used. The down-conversion process begins with step 250 of generating header information. The header information is defined by style definition for a "#header" style in a style sheet for the given document type definition of the selected SGML document. This "#header" style should not be confused with a <header>element, but is rather a reserved style name. Such a style sheet typically defines, for each style, the attributes <text-before>, <text-after> and <hide>. If the <hide>attribute is false for the style definition of the "#header" style, the header is displayed. This #header style may also be used to generate a header for a printed output. Style definitions of other elements and to perform other features are described in more detail below. Example style definitions of the #header style are provided below. Functions to be evaluated within a style definition are evaluated in the context of the particular element to which the style is currently being applied. In example 3, the function "get_type" returns the element type of the element specified by its parameter, in this case the parent of the header element, such as "Chapter" or "Section". The function "get_attr" obtains the copyright date of the root element, i.e., the book. The "get_env" function returns a named piece of information from the environment of the server.

```
<style Name=#header>
    <text-before> "This document Copyright 1996"
        </text-before>
    <text-after></text-after>
    <hide>false </hide>
</style>
```

EXAMPLE 1

```
<style Name=#header>
    <text-before> "<A href=home.html>image.gif </A>"
        </text-before>
    <text-after></text-after>
    <hide>false </hide>
</style>
```

EXAMPLE 2

```
<style Name=#header>
    <text-before> "This"; get_type(parent( )); "Copy-
       right";
       get_attr(root( ), "copyright_date");
       get_env(owner_name)
       </text-before>
    <text-after></text-after>
    <hide>false </hide>
</style>
```

EXAMPLE 3

In any of these examples, the content appended to the document may be defined by either the #header or the #footer styles, using either the text-before or text-after fields. It should be understood that using the #footer style places the additional content at the end of the document fragment being sent, and that using the header style places the additional content at the beginning.

This feature is particularly useful for generating copyright notices on the fly for arbitrary fragments of the SGML document to be transmitted. Thus, these notices do not have to be prepared in advance for particular selected document fragments and allows for a dynamic selection of fragments. The context information may also be used for a variety of customizations, particularly "button bars", other graphical images or text that are linked to commands or other portions of a document on the World Wide Web. Such links may be provided to document fragments before and after the currently viewed fragment.

Steps 252 through 260 generally describe the same steps used to render a document as described in U.S. patent application Ser. No. 07/733,204. The difference in this invention arises in the use of the style sheet which implements the document type definition mapping table. By use of the style sheets to implement this mapping table, SGML documents in other document type definitions (DTDs) can be readily down-converted to HTML documents, though the reverse is typically more difficult. Such a mapping table is a declarative specification of the transformation.

More particularly, a portion of a document beginning with a selected element is processed by first identifying its ancestors in step 252. This is readily done using the element directory 91 discussed above. The style definitions for these ancestor elements are then processed in step 254. Generally, the ancestors are first identified and their identification is pushed onto a stack in an upward traversal of the tree structure of the document. The style definitions are processed by pushing conversion information onto a stack while popping ancestor information off another stack until the selected element is finally reached. When the selected element is reached, its style definition is processed in step 256. Descendants of the selected elements are then processed one at a time through steps 258 and 260 until enough data has been processed, as determined by step 260. A simple way to determine whether enough data has been generated is by merely setting a threshold on the amount of data in the resulting HTML document. Data may also be limited for other reasons. For example, given an indication of the bandwidth available to a user, such as the baud rate used by the user, the amount of data sent can be limited. Additionally, given information about vision impairment of the user, the system can avoid sending images to a blind user, sending only text to be converted by the browser to audio or to braille. Such information may be indicated by the client type.

After completion of steps 258 and 260, additional context information is generated in step 262 using the #footer style. The #footer style is customizable just like the #header style as described above in connection with step 250. Step 262 completes the generation of the HTML document which then can be sent to the client system in step 264.

The use of style sheets to act as a mapping table to provide a variety of functions will now be described. The document type definition mapping table is implemented as an SGML style sheet. In particular, for each type of element tag in the document type definition for the SGML document and for the header and footer, there is a style definition in a style sheet in the following form:

```
<style Name=tagtype>
    <text-before> . . . </text-before>
    <text-after> . . . </text-after>
    <hide> . . . </hide>
</style>
```

While the style sheets may include numerous properties, the ones primarily used for a mapping table are the <text-before>, <text-after>, and <hide>attributes. The <hide>attribute is used to delete elements of which the content is not sent or down-converted. For example, some information found in an SGML document, such as the front matter or information requiring security access, can be prevented from being sent. The <hide>attribute is true when the element should not be sent and is false otherwise. Conditional operations may be provided in the <hide>attribute for security functions.

The <text-before> and <text-after>attributes are used to generate the HTML tags corresponding to the element tag for which the style definition is being made. There is a great amount of flexibility in defining the content of the <text-before> and <text-after> tags, including conditional, logical and arithmetic operations to be performed. A powerful variety of features may be provided using such a style sheet.

In the simplest example, a paragraph element tag <P> in SGML is mapped to a like-named "<P>" in HTML by defining the following style sheet:

```
<style Name=P>
    <text-before>"<P>"</text-before>
    <text-after>"</P>"</text-after>
    <hide>false </hide>
</style>
```

More complicated HTML markup can be generated. For example, if the element tag in SGML is a warning tag <warn>, the following style sheet could be used to create an extra paragraph as a centered heading above the warning itself:

```
<style Name=warn>
    <text-before>"<P type=C>warning</P><P>"
       </text-before>
    <text-after>"</P>"</text-after>
    <hide>false </hide>
</style>
```

Cross-references within the SGML document can be generated using a style sheet, for example, one in the following form:

```
<style Name=art>
    <text-before>"<A href=http://www.ebt.com/pro/
        abook#EID(";
        first-child( );")>"</text-before>
    <text-after>"</A>"</text-after>
    <hide>false </hide>
</style>
```

It should be understood that the URL in this example may be constructed using functions to obtain some of its parts, such as the host identifier, to further reduce document management effort.

Tags in the source markup language which have no corresponding tag in the target markup language can be translated by having a null string for <text-before> and <text-after>attributes, and the <hide>attribute set to false.

Even more interesting document conversions may be made using conditional or other types of operations in the style sheets. For example, because the standard communication protocol used by the World Wide Web requires an indication of the identity of the client in any message sent from the client to the server, a conditional operation may be performed according to the identity of the client. Thus, particular features available in some client systems and not in others may be generated by the server if the presence of that client is detected. This capability eliminates the requirement of current systems that different documents be maintained for different browser types. For example, the following style sheet could be used:

```
<style Name=announce>
    <text-before>if client-type=Netscape then
        "<new-feature-tag>" else
        "<common-feature-tag>"</text-before>
    <text-after>. . . </text-after>
    <hide>false </hide>
</style>
```

The conditional operation can also be performed on the element type of the document fragment being transmitted. The following Header style sheet provides and example:

```
<style Name=#header>
    <text-before>if element-type=chap then
        "<P>This Chapter Copyright 1995 </P>" else
        "<P>This Section Copyright 1995 </P>"</text-
        before>
    <text-after>"" </text-after>
    <hide> false </hide>
</style>
```

Figure 15:
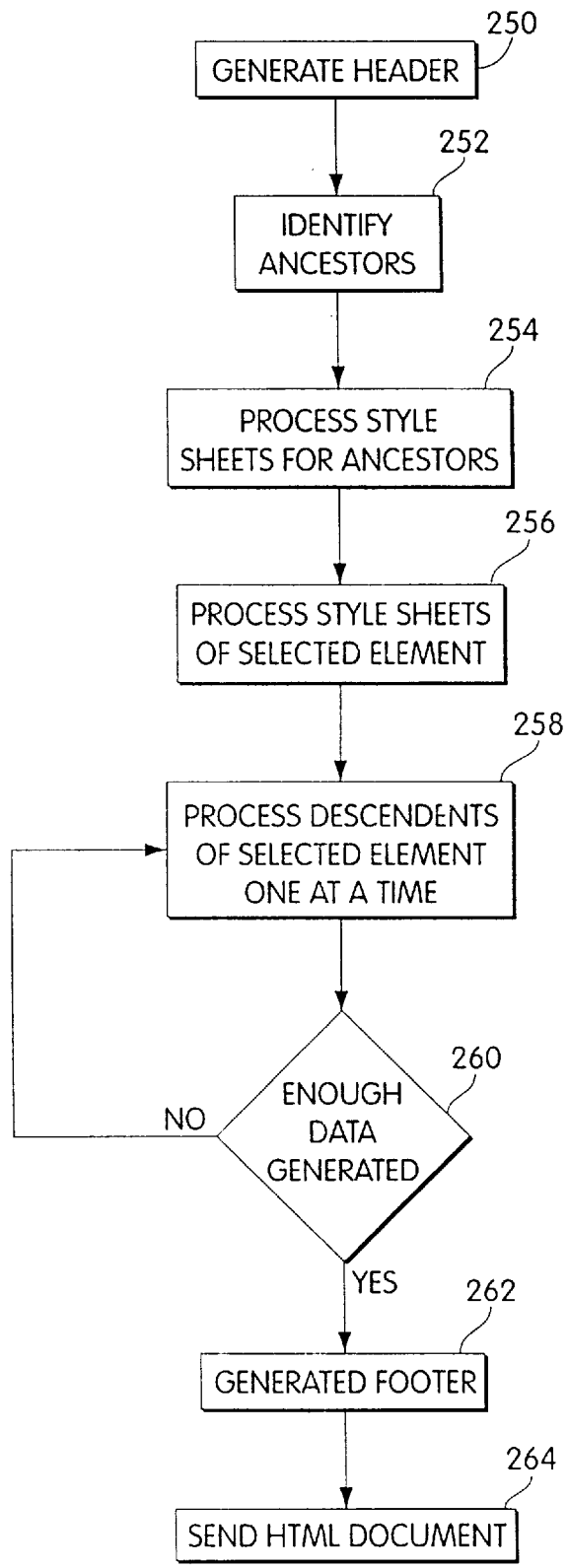
FIG. 15 is a flowchart describing how a markup document is down-converted to a document using a different markup language.

Additionally, this kind of conditional branching based on the type of element selected or on the type of client detected can be used as a preprocessing or postprocessing step in the process shown, for example, in FIG. 15. For example, if a particular client is detected that can handle display of two related documents in separate windows or window portions, the process of FIG. 15 could be modified to send, first, a brief table of contents of the document, followed by any necessary delimiter, then by the processed document fragment. Manipulating such delimiters may also be useful in sending both table of contents and full-text searching results for display by the client into separate window portions.

The construction of a table of contents, and a data structure representing the table of contents will now be described in connection with FIGS. 16–18. A table of contents is represented using a table of contents directory very similar to the element directory described above. Only those elements which have titles are considered to be elements of the table of contents tree. For example, the table of contents directory may use the same element identifier numbers as the element directory, but contain different pointers (and several "null" pointers) to represent the table of contents. As another example, the table of contents directory may use its own set of identifiers, but for each identifier include a field indicating the element in the element directory to which the identifier corresponds, as well as the parent, sibling and child fields. In either of these examples, it may increase computational efficiency to include a field with a pointer to the title element corresponding to the element and/or a pointer to the text content of the title of the element. As another example, the table of contents information may be represented by additional fields in the element directory, of which many would be null but which would indicate parent, child and sibling relationships of the elements of the table of contents. As yet another example, a bit could be used in the element directory to indicate whether the element is in the table of contents. The sibling and children elements in the table of contents tree can then be determined by traversing the element directory tree and comparing this bit, for example, for sibling and child elements.

With such a representation of the table of contents, the chapter and section elements in a sample document of FIG. 5 are included in the table of contents. A table of contents directory can be generated following generally the same procedure as for generating the element directory. For the purposes of processing a table of contents, however, a style definition for an element also includes a field that identifies the element containing the actual text of the title, herein called a title bearer, for the element which is a titled element. Generally, the title bearer of a titled element is the first child of the title element or has some other fixed relationship. Only those elements for which the style definition indicates a title bearer are included in the table of contents.

The relationship of a table of contents directory to an element directory will now be described in connection with FIGS. 17 and 18. FIG. 17 illustrates the tree-like structure of a document as defined by its markup. Leaf elements for text and other content have been omitted for clarity. For example, this book contains an abstract, two chapters separated by an epigram and an epilogue. Each chapter includes a title, two sections and a summary. Each section includes a title and two paragraphs. A table of contents is defined to include only significant elements of the document, e.g., elements which have a title. Thus, a tree representing the table of contents includes a book element, containing two chapter elements, each of which contain two section elements. The section elements are the leaves of the table of contents tree. Thus, the table of contents tree can be represented using a structure like the element directory and can be constructed in a similar manner. Such a representation of the table of contents tree may be used to generate a document representing the table of contents, as described in connection with FIG. 16 and to control access to document fragments which are previous and subsequent to a viewed document portion, as described below in connection with FIGS. 19–21.

Figure 16:
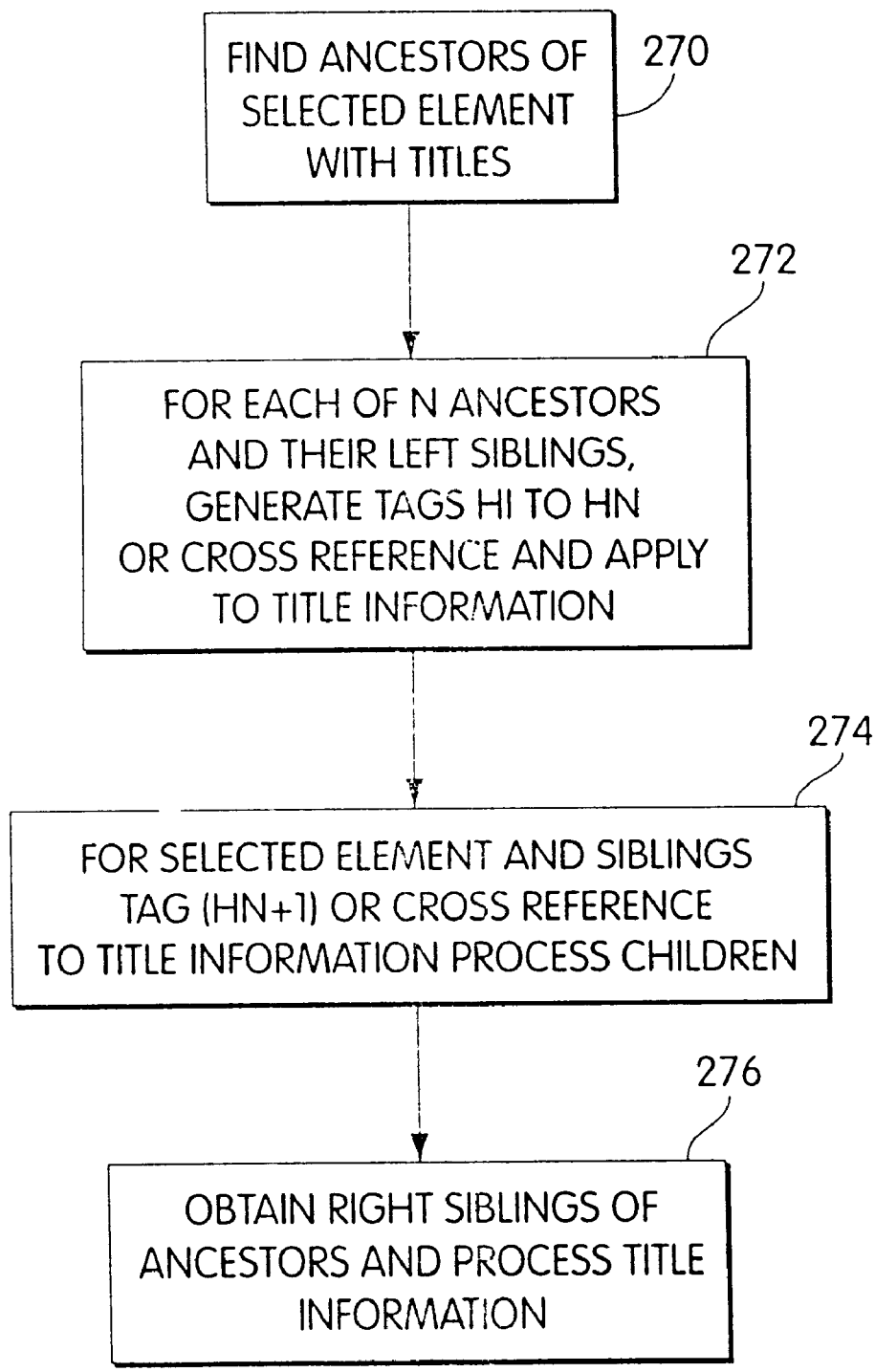
FIG. 16 is a flowchart describing how a table of contents is generated.

Referring now to FIG. 16 how a table of contents is generated for a document upon receipt of an indication of an element within that document will now be described. In general, the goal of the table of contents display is to retrieve the title information for the siblings of the selected element, the children of the selected element, and the siblings of ancestors of the selected element, but not the children of any of the ancestor's siblings. In other words, if the selected portion of the table of contents to be expanded is a section within one chapter of a ten chapter book, which is a volume of a five volume set, the table of contents indicates the titles of: the volumes in the set, the chapters in the selected book, and the sections within the chapter containing the selected section as well as the subsections of the selected section.

The first step of preparing the table of contents is identifying the ancestors of the selected element with titles as indicated by step 270 in FIG. 16. These are placed on a stack in a reverse traversal of the tree. Next, for each ancestor, the title information of its left siblings is then obtained and processed. After processing all of the left sisters, the children of the selected elements are then processed after processing of the selected elements left siblings. After processing the selected element, the right siblings of the ancestors are then processed in step 278. Processing and display of either or both of the left and right siblings of ancestor elements is optional.

The resulting table of contents document includes the printed titles of each section as hypertext links to those sections. These are generated by the following markup in HTML: <A HREF=http://www.ebt.com/pro/abook#EID(x)>"Title of element" </A>, where x is the element identifier of the titled element and "Title of element" is its title obtained from the title bearing element.

For each of the ancestors and their siblings, it may also be desirable to place an indicator in the displayed table of contents to show whether further expansion of that level of the tree is possible within the table of contents structure. An element has this status when any of its children are titled and have corresponding title bearing elements. The indicator may be represented in the resulting table of contents document as a hypertext link that is a request to the server to further expand the table of contents based on the indicated element. Such a request is in the form of a document locator and element locator where the element locator indicates that a table of contents is desired, e.g., http://www.ebt.com/pro/abook#TOC(3).

When full-text searching capabilities are being used, a relevant indicator, for example, the number of occurrences of a particular word, also may be provided before each element in the table of contents. For example, a variable called "search-active" may be set when a search has been performed. If this variable is set, then before each title in the table of contents the following string may be inserted: "<B>#</B>", where # indicates the number of occurrences of the word in the current element, as determined by the table of FIG. 8.

The table of contents tree can also be used to control traversal of the document and provide a capability to the user of viewing portions of a document which are previous and subsequent to a currently viewed fragment. This capability is provided by using the table of contents tree as an indication of "significant elements" and "significant leaf elements." A significant element is an element having a title. In other words, a significant element is any element of the table of contents tree. A significant leaf element is any significant element that contains no significant element. In other words, the significant leaf elements are the leaf elements of the table of contents tree and have entries in the table of contents directory which have no children.

When a table of contents is displayed to a user, a user eventually requests display of a significant leaf element. When this element is displayed, it may be processed to include a hyperlink allowing access to the previous and subsequent chunks to be performed. A problem to be solved in processing requests for previous and subsequent chunks is that these commands should eventually bring a user through the entire document, including content not directly included within a significant element. Such a result is provided by rendering text near a significant leaf element that is "related" to the significant leaf element but is not significant.

Figure 19:
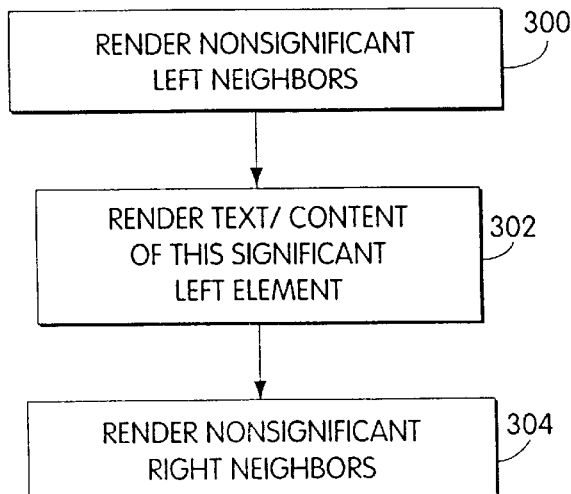
FIG. 19 is a flow chart describing how a significant leaf element of the tree of FIG. 18 is rendered.
Figure 20:
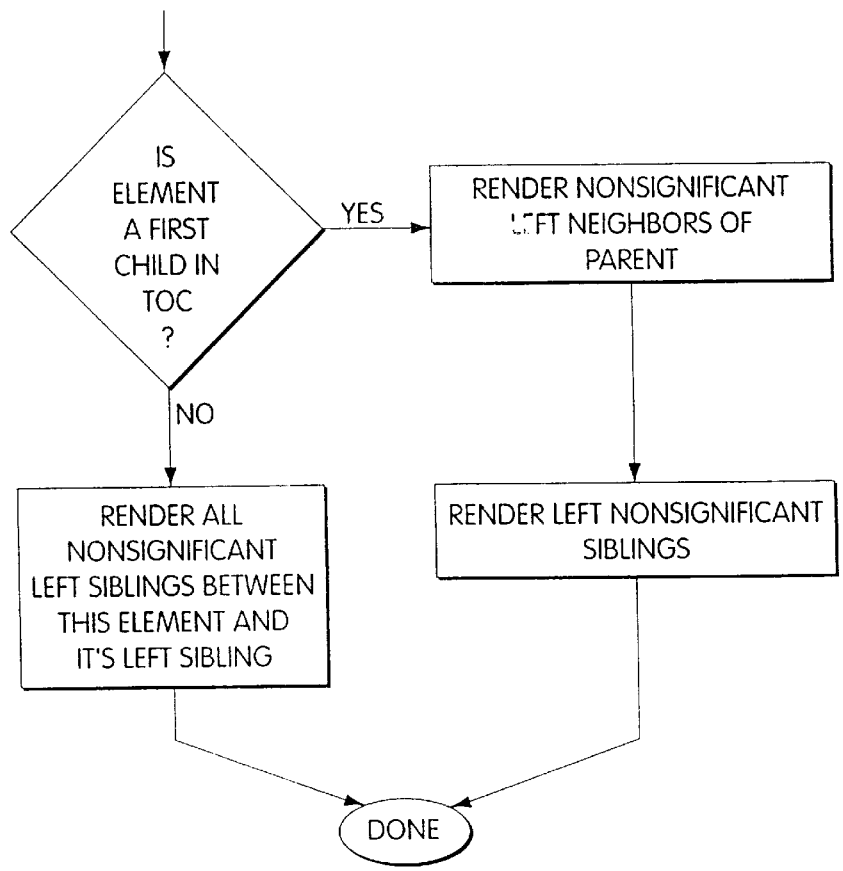
FIG. 20 is a flow chart describing how nonsignificant left neighbors of a significant element are rendered.
Figure 21:
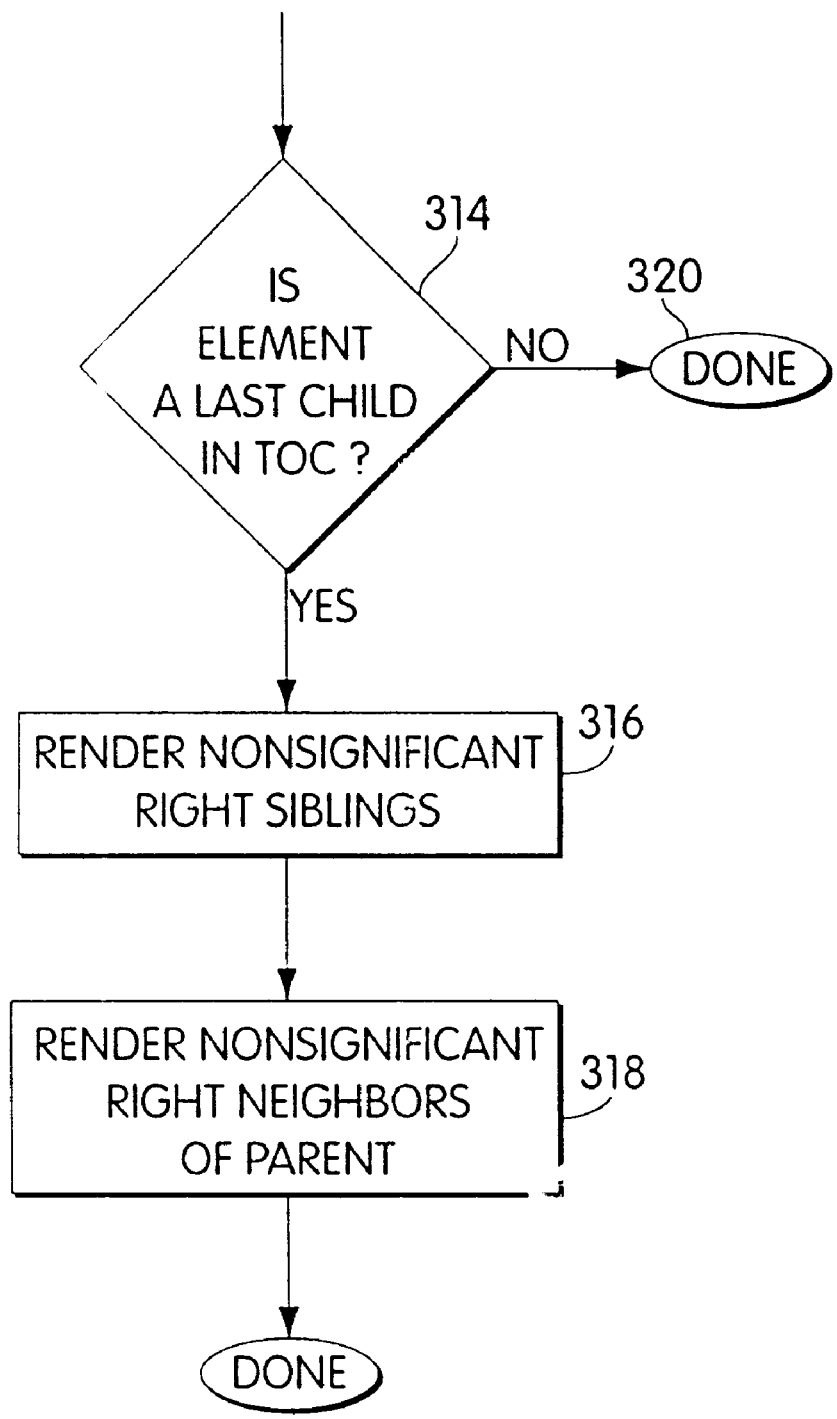
FIG. 21 is a flow chart describing how nonsignificant right neighbors of a significant element are rendered.

An example method for implementing such a feature is found in FIGS. 19–21. Generally, in this example, for a significant leaf element which is a first child in the table of contents tree, all the insignificant elements left of the current significant element are rendered. then the insignificant elements left of each ancestor node are rendered, until the current node is one which is also an ancestor of the significant leaf node which would have been rendered before the initial significant leaf node. For any significant element which is a child element in the table of contents tree, including those which are first children, the table of contents tree is traversed from the current node until another significant leaf node is found. All non-significant elements as found in the element directory following the other identified significant leaf node are rendered.

Referring now to FIG. 19, rendering of a significant leaf element will now be described. The first step of this process involves rendering the nonsignificant left neighbors, if any, of the significant leaf element (step 300), as determined by the element directory. This step is described in more detail in connection with FIG. 20. Next, the content of the selected significant leaf element is rendered in step 302 in accordance with the procedures outlined above, by applying style definitions to the contents of the significant leaf element and all of its descendants. Finally, the nonsignificant right neighbors, if any, of the significant leaf element, as defined by the element directory, are then rendered in step 304. This step is described in more detail in connection with FIG. 21.

FIG. 20 describes the rendering of nonsignificant left neighbors of a significant element as defined by the element directory. In this recursive process, it is first determined whether the current significant element is a first child of a significant element in the table of contents directory in step 306. This may be determined by obtaining the left sibling pointer for the significant element from the table of contents directory. If the left sibling is null, then the significant element is a first child and processing continues by obtaining the parent pointer of this significant element from the table of contents directory and, if the parent pointer is not null, recursively rendering the nonsignificant left neighbors of this parent element. When the recursive calls complete, the nonsignificant left siblings of the significant element, as defined in the element directory, are then rendered (step 310). If the left sibling in the table of contents of the current significant element is not null, indicating that the current significant element is not a first child element in the table of contents (step 306), then the nonsignificant left siblings in the element directory between the left sibling of the current significant element and the current significant element are rendered in step 312. This process involves obtaining the element identifier in the element directory of the left sibling of the current significant element. Next, the right sibling in the element directory of the obtained element identifier is then obtained. This element and all of its children, and all of its right siblings up to but not including the current significant element are rendered.

The rendering of nonsignificant right neighbors in the element directory of a significant element will now be described in connection with FIG. 21. In this recursive process, it is first determined whether the current significant element is a last child of a significant element in the table of contents directory in step 306. This may be determined by obtaining the right sibling pointer for the significant element from the table of contents directory. Nothing is rendered for the current significant element if it is not a last child as indicated at 320. If the right sibling is null, then the significant element is a last child and processing continues by rendering the nonsignificant right siblings in the element directory of the current significant element. This is performed by obtaining the element identifier in the element directory of the current significant element. Then, each of its right siblings, as determined by traversing the element tree, is rendered. After step 316 is complete, the process in step FIG. 21 is recursively performed on each ancestor in the table of contents directory of the current significant element. This is performed by obtaining the parent pointer of this significant element from the table of contents directory and, if the parent pointer is not null, recursively rendering the nonsignificant right neighbors of this parent element. After processing of the ancestors, the rendering process for the significant leaf element is complete.

Figure 17:
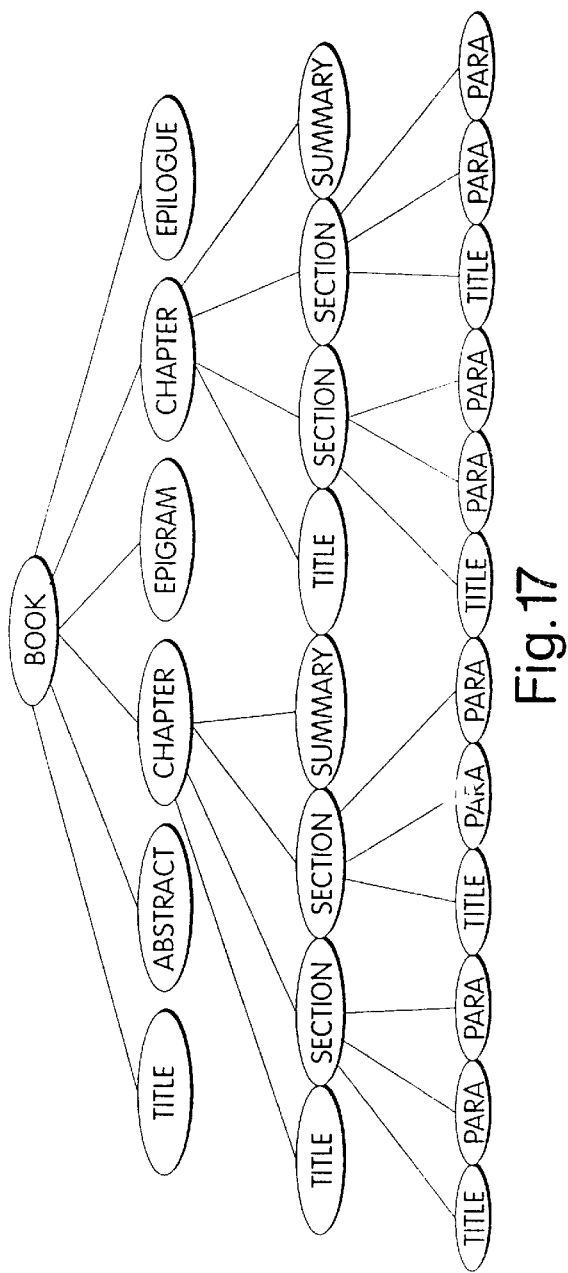
FIG. 17 is a diagram of a tree structure of an example electronic document.
Figure 18:
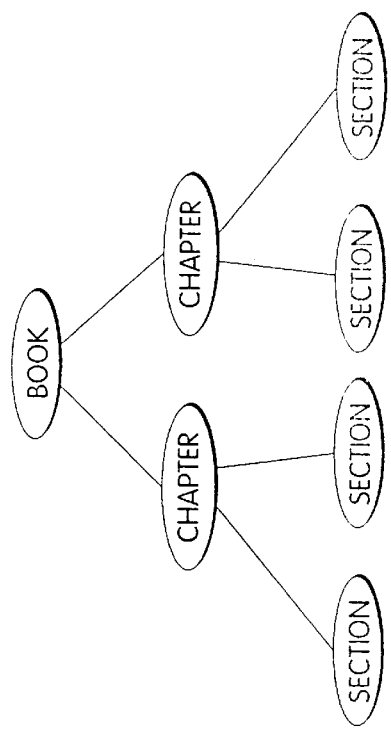
FIG. 18 is a diagram of a tree structure of only significant elements in the electronic document.

Using the procedure outlined above, rendering of the first section of the first chapter in the book illustrated in FIG. 17 results in rendering of the book title, abstract, first chapter title and the section. Rendering of the second section of the first chapter results in the rendering of the second section and the first chapter summary. Rendering of the first section of the second chapter results in rendering of the epigram, the second chapter title and the section. Rendering of the second section of the second chapter results in rendering the second section, the second chapter summary and the epilogue. This procedure works for an arbitrarily large document having a structure defining an arbitrarily deep trees. It should be apparent that this embodiment is left-biased, in that nonsignificant elements between significant sibling elements are rendered as the nonsignificant left neighbors of their right siblings. These processes may be made to be right biased also. It should also be understood that the definition of a significant element is not limited only to titled elements. Other definitions of significant elements may also be used, for example, a definition may be based on the kind of element. In general, the definition of a significant element is based on a document type definition or on a style sheet for a document.

By relying on two definitions of the structure of an electronic document using a generalized markup language, the present invention improves document management by permitting a user to view self-contained document fragments and to navigate between different document fragments in a manner which provides consistent results to the user. The need to generate may small documents with hyperlinks between them is eliminated. If a document is modified, only the representations of its structure need to be recomputed. It is no longer necessary to determine whether hyperlinks between document chunks remain valid after an edit.

In addition, by providing a system for rendering electronic published documents which uses a generalized markup language and a declarative specification, such as a style sheet, for formatting the document into a specific markup language or streams of graphic instructions, this form of document management is greatly simplified. For example, if a new target markup language is made available or if a new tag is added to a particular markup language, all documents can be delivered in the new target markup language merely by changing the declarative specification without modifying the document. A large amount of document management effort, such as modifying individual documents and the risks inherent in such modification, is avoided. The declarative specification is also useful in an environment where a variety of client systems using different target markup languages are being used simultaneously by possible consumers of the published documents. The system described herein allows many versions of a single deliverable to be readily available to these users. Additionally, the need to maintain many small documents and to provide navigational documents is eliminated because they are generated dynamically instead. Additionally, navigational tools such as full text indices and tables of contents may be used to improve information retrieval.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer system for producing a digital form of a digital document having descriptive markup defining hierarchical elements, the computer system comprising:

means for accessing a first representation of a hierarchy of all elements in the digital document;

means for accessing a second representation of the hierarchy of only significant elements in the digital document;

means for extracting a portion of the digital document, including:

means for selecting as a defining element a significant element from the second representation which defines the portion; and means for selecting elements, including means for selecting elements adjacent in the first representation both to the defining element according to a relationship of the adjacent elements in the first representation to the defining element and to a sibling in the second representation of the defining element; and means for producing a digital form of the portion comprising the defining element and selected elements.

2. The computer system of claim 1, wherein the means for selecting the defining element includes means for selecting only a leaf element of the second representation.

3. The computer system of claim 1, wherein a significant element is an element having a title element.

4. The computer system of claim 1, wherein the means for selecting elements in the first representation includes:

means for selecting elements in the first representation which are between the defining element as represented in the first representation and the sibling as represented in the first representation according to a depth-first ordering of elements of the first representation.

5. The computer system of claim 4, wherein the sibling is a left sibling and wherein the means for selecting elements further recursively selects elements in the first representation between the defining element and any left sibling in the second representation of any ancestor element in the second representation of the defining element, according to a depth-first ordering of elements of the first representation, when the defining element is a first child element in the second representation of the ancestor element.

6. The computer system of claim 4, wherein the sibling is a right sibling and wherein the means for selecting selects no elements after the defining element in the first representation if the defining element is not a last child element in the second representation.

7. The computer system of claim 6, wherein the means for selecting recursively selects all elements which are after the defining element in the first representation according to a depth-first ordering of elements in the first representation and which are child elements in the first representation of the ancestors in the second representation of the defining element if the defining element is a last child element in the second representation.

8. A process for making a digital information product comprising computer data signals defining a digital form of a digital document having descriptive markup defining hierarchical elements, the process comprising:

accessing a first representation of a hierarchy of all elements in the digital document;

accessing a second representation of the hierarchy of only significant elements in the digital document;

extracting a portion of the digital document, including:
  selecting as a defining element a significant element from the second representation which defines the portion; and
  selecting elements, including selecting elements adjacent in the first representation to the defining element according both to a relationship of the selected elements in the first representation to the defining element and to a sibling in the second representation of the defining element; and
  producing a digital form of the portion comprising the defining element and selected elements, and encoding the digital form in a computer data signal.

9. The process of claim 8, wherein selecting the defining element includes selecting only a leaf element of the second representation.

10. The process of claim 8, wherein a significant element is an element having a title element.

11. The process of claim 8, wherein selecting elements in the first representation includes:

selecting elements in the first representation which are between the defining element as represented in the first representation and the sibling as represented in the first representation according to a depth-first ordering of elements of the first representation.

12. The process of claim 11, wherein the sibling is a left sibling and wherein the selecting elements further recursively selects elements in the first representation between the defining element and any left sibling in the second representation of any ancestor element in the second representation of the defining element, according to a depth-first ordering of elements of the first representation, when the defining element is a first child element in the second representation of the ancestor element.

13. The process of claim 11, wherein the sibling is a right sibling and wherein selecting selects no elements after the defining element in the first representation if the defining element is not a last child element in the second representation.

14. The process of claim 13, wherein selecting recursively selects all elements which are after the defining element in the first representation according to a depth-first ordering of elements in the first representation and which are child elements in the first representation of the ancestors in the second representation of the defining element if the defining element is a last child element in the second representation.

15. A computer system for producing a digital form of a digital document having descriptive markup defining hierarchical elements, and having a first representation of a hierarchy of all elements in the digital document and a second representation of the hierarchy of only significant elements in the digital document, the computer system comprising:

a first data selection component that produces as an output a defining element, wherein the defining element is a significant element from the second representation that defines a portion of the digital document;

a second data selection component which receives as an input the defining element and produces as outputs selected elements, wherein the selected elements are elements adjacent in the first representation to the defining element, selected according to a relationship of the adjacent elements in the first representation to both the defining element and to a sibling in the second representation of the defining element; and a data structuring component which receives as inputs the defining element and selected elements and produces as an output a digital form of the portion.

16. The computer system of claim 15, wherein the defining element is a leaf element of the second representation.

17. The computer system of claim 15, wherein a significant element is an element having a title element.

18. The computer system of claim 15, wherein the selected elements are elements between the defining element as represented in the first representation and the sibling as represented in the first representation according to a depth-first ordering of elements of the first representation.

19. The computer system of claim 18, wherein the sibling is a left sibling and the selected elements further include elements selected recursively from the first representation, the elements being between the defining element and any left sibling in the second representation of any ancestor element in the second representation of the defining element, according to a depth-first ordering of elements of the first representation, when the defining element is a first child element in the second representation of the ancestor element.

20. The computer system of claim 18, wherein the sibling is a right sibling and no selected elements are from after the defining element in the first representation if the defining element is not a last child element in the second representation.

21. The computer system of claim 20, wherein the selected elements include elements selected recursively from all elements which are after the defining element in the first representation according to a depth-first ordering of elements in the first representation and which are child elements in the first representation of the ancestors in the second representation of the defining element, if the defining element is a last child element in the second representation.

22. A process for producing a digital form of a digital document having descriptive markup defining hierarchical elements, the process comprising:

accessing a first representation of a hierarchy of all elements in the digital document;

accessing a second representation of the hierarchy of only significant elements in the digital document;

extracting a portion of the digital document, including:
  selecting as a defining element a significant element from the second representation which defines the portion; and
  selecting elements, including selecting elements adjacent in the first representation to the defining element according to a relationship of the selected elements in the first representation both to the defining element and to a sibling in the second representation of the defining element; and producing a digital form of the portion comprising the defining element and selected elements.

23. The process of claim 22, wherein selecting the defining element includes selecting only a leaf element of the second representation.

24. The process of claim 22, wherein a significant element is an element having a title element.

25. The process of claim 22, wherein selecting elements in the first representation includes:

selecting elements in the first representation which are between the defining element as represented in the first representation and the sibling as represented in the first representation according to a depth-first ordering of elements of the first representation.

26. The process of claim 25, wherein the sibling is a left sibling and wherein the selecting elements further recursively selects elements in the first representation between the defining element and any left sibling in the second representation of any ancestor element in the second representation of the defining element, according to a depth-first ordering of elements of the first representation, when the defining element is a first child element in the second representation of the ancestor element.

27. The process of claim 25, wherein the sibling is a right sibling and wherein selecting selects no elements after the defining element in the first representation if the defining element is not a last child element in the second representation.

28. The process of claim 27, wherein selecting recursively selects all elements which are after the defining element in the first representation according to a depth-first ordering of elements in the first representation and which are child elements in the first representation of the ancestors in the second representation of the defining element if the defining element is a last child element in the second representation.

29. A computer program product for producing a digital form of a digital document having descriptive markup defining hierarchical elements, and having a first representation of a hierarchy of all elements in the digital document and a second representation of the hierarchy of only significant elements in the digital document, the computer program product comprising:

a computer readable medium having computer program logic stored thereon, wherein the computer program logic defines:

a first data selection component that produces as an output a defining element, wherein the defining element is a significant element from the second representation that defines a portion of the digital document;

a second data selection component which receives as an input the defining element and produces as outputs selected elements, wherein the selected elements are elements adjacent in the first representation to the defining element, selected according to a relationship of the adjacent elements in the first representation to both the defining element and to a sibling in the second representation of the defining element; and a data structuring component which receives as inputs the defining element and selected elements and produces as an output a digital form of the portion.

30. The computer program product of claim 29, wherein the defining element is a leaf element of the second representation.

31. The computer program product of claim 29, wherein a significant element is an element having a title element.

32. The computer program product of claim 29, wherein the selected elements are elements between the defining element as represented in the first representation and the sibling as represented in the first representation according to a depth-first ordering of elements of the first representation.

33. The computer program product of claim 32, wherein the sibling is a left sibling and the selected elements further include elements selected recursively from the first representation, the elements being between the defining element and any left sibling in the second representation of any ancestor element in the second representation of the defining element, according to a depth-first ordering of elements of the first representation, when the defining element is a first child element in the second representation of the ancestor element.

34. The computer program product of claim 32, wherein the sibling is a right sibling and no selected elements are from after the defining element in the first representation if the defining element is not a last child element in the second representation.

35. The computer program product of claim 34, wherein the selected elements include elements selected recursively from all elements which are after the defining element in the first representation according to a depth-first ordering of elements in the first representation and which are child elements in the first representation of the ancestors in the second representation of the defining element, if the defining element is a last child element in the second representation.

* * * * *